United States Patent
Ino et al.

(10) Patent No.: US 8,314,782 B2
(45) Date of Patent: Nov. 20, 2012

(54) DISPLAY APPARATUS

(75) Inventors: Masumitsu Ino, Kanagawa (JP);
YingBao Yang, Kanagawa (JP);
Tsutomu Tanaka, Kanagawa (JP);
Kazunori Yamaguchi, Kanagawa (JP);
Masaru Higuchi, Tokyo (JP)

(73) Assignee: Sony Corporation, Tokyo (JP)

( * ) Notice: Subject to any disclaimer, the term of this patent is extended or adjusted under 35 U.S.C. 154(b) by 943 days.

(21) Appl. No.: 12/271,326

(22) Filed: Nov. 14, 2008

(65) Prior Publication Data

US 2009/0146967 A1    Jun. 11, 2009

(30) Foreign Application Priority Data

Dec. 5, 2007  (JP) ................ 2007-315287

(51) Int. Cl.
*G06F 3/041* (2006.01)
(52) U.S. Cl. .......... 345/175; 345/76
(58) Field of Classification Search .......... 345/173, 345/175, 76, 88, 174; 348/14.01, 340, 552; 178/18.03, 18.09, 18.11; 349/12
See application file for complete search history.

(56) References Cited

U.S. PATENT DOCUMENTS

| | | | | |
|---|---|---|---|---|
| 2006/0244693 A1 * | 11/2006 | Yamaguchi et al. | ............ | 345/76 |
| 2006/0279557 A1 * | 12/2006 | Gettemy | ................ | 345/175 |

FOREIGN PATENT DOCUMENTS

| | | |
|---|---|---|
| JP | 08-153179 | 6/1996 |
| JP | 2000-330090 | 11/2000 |
| JP | 2003-255318 | 9/2003 |
| JP | 2003-255318 | * 10/2003 |
| JP | 2005-275644 | 10/2005 |
| JP | 2006-030369 | 2/2006 |
| JP | 2006-301864 | 11/2006 |

* cited by examiner

*Primary Examiner* — Hoa T Nguyen
*Assistant Examiner* — Andrew Sasinowski
(74) *Attorney, Agent, or Firm* — Robert J. Depke; Rockey, Depke & Lyons, LLC

(57) ABSTRACT

Disclosed herein is a display apparatus including a display section; a light radiating section; a plurality of light converging lenses; and a plurality of light receiving devices, wherein the display section includes pixel areas each used for creating a pixel section, and sensor areas each used for creating one of the light receiving devices; the light radiating section outputs light and radiates the output light to the display section from a particular-side surface of the display section; each of the light converging lenses is created in one of the sensor areas each located in the display section and converges light generated by the light radiating section on a focal point inside the display section, passing on the converged light to the other-side surface of the display section; and each of the light receiving devices is created in one of the sensor areas to serve as a device for receiving light which arrives at the other-side surface of the display section as light reflected by a subject of detection.

7 Claims, 10 Drawing Sheets

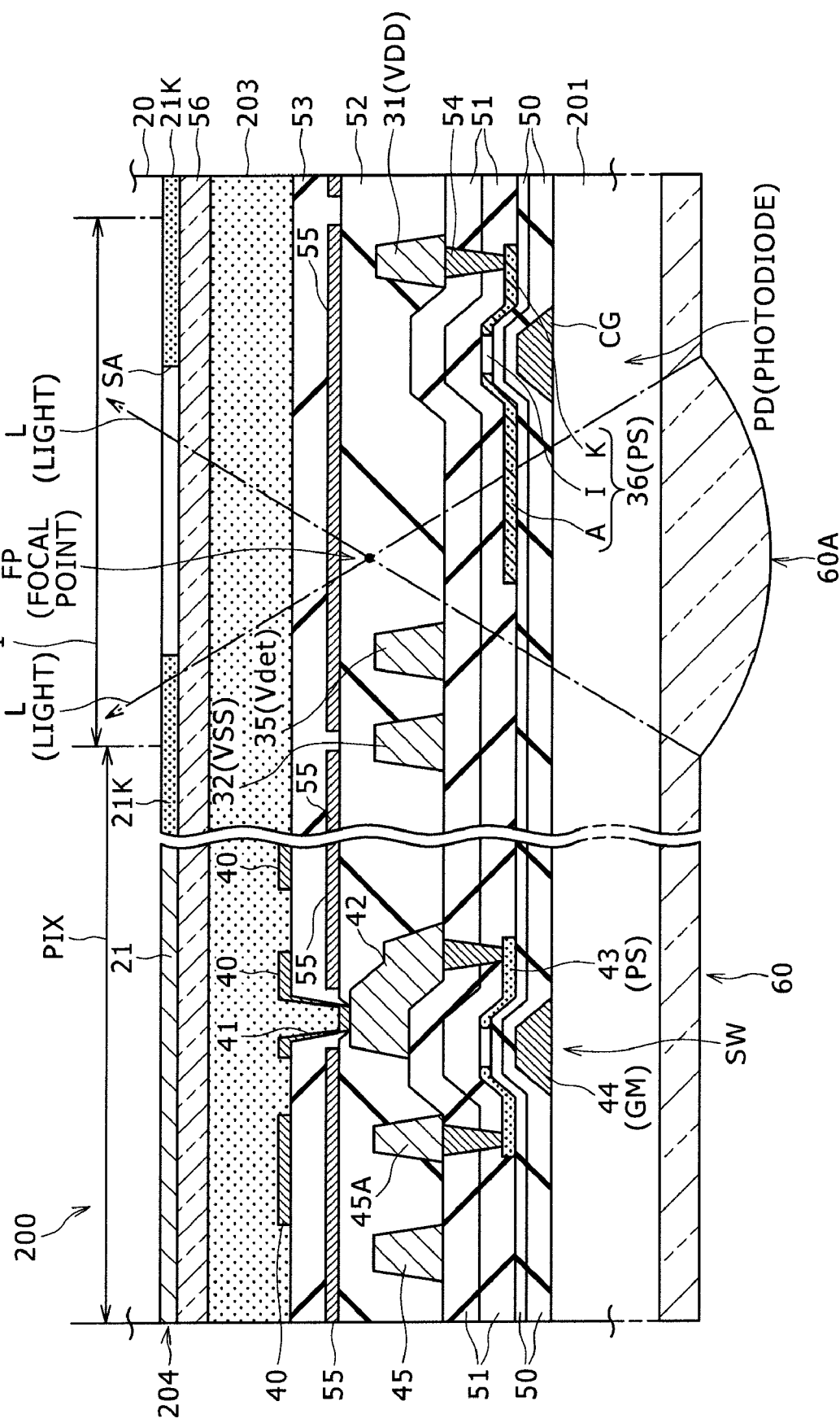

DISPLAY APPARATUS

CROSS REFERENCES TO RELATED APPLICATIONS

The present invention contains subject matter related to Japanese Patent Application JP 2007-315287 filed in the Japan Patent Office on Dec. 5, 2007, the entire contents of which being incorporated herein by reference.

BACKGROUND OF THE INVENTION

1. Field of the Invention

In general, the embodiment of the present invention relates to a display apparatus provided with a display section having pixel areas and sensor areas in each of which a pixel section and a light receiving device are created respectively. In particular, the embodiment of the present invention relates to a technology for improving the efficiency of utilization of light which is reflected by a detection-subject body coming into contact with the display section or approaching the display section and received by a plurality of aforementioned light receiving devices. In the following description, the detection-subject body is also referred to as a subject of detection or merely a detection subject.

2. Description of the Related Art

Commonly known display apparatus are liquid-crystal display apparatus, organic EL (Electro Luminescence) display apparatus and display apparatus adopting an electrophoretic method.

As the display apparatus become thinner, there is also a desire for a multi-functional display apparatus having a function used as the function of an input apparatus to receive a command entered by the user in addition to the original function provided for the display apparatus as a function to show the user a display such as an image and character information. In response to such a desire, there has been introduced a display apparatus capable of detecting an operation carried out by the user to bring a finger of the user or a stylus pen such as the so-called touch pen into contact with the display screen of the display apparatus or to move the finger or the pen to approach the display screen.

It is possible to detect a movement made by a finger or such a pen to come into contact with the display screen of a display apparatus or to approach the display screen by making use of a touch panel provided for the display apparatus to serve as a panel adopting a resistive membrane method or an electro-static capacitance method. There is a display apparatus employing a touch panel added on the display-face side of a display panel which is typically a liquid-crystal panel.

However, addition of such a touch panel makes it difficult to reduce the thickness of the display panel and increases the cost too. Particularly, in the case of a touch panel adopting the resistive membrane method, a change in resistance may not be detected unless the touch panel is pressed by a force having a magnitude of a certain degree. If the touch panel is pressed by such a force, however, the display surface is distorted. In addition, a touch panel adopting the resistive membrane method abides by the principle of 1-point detection. Thus, the number of applications for the touch panel adopting the resistive membrane method is limited.

Documents such as Japanese Patent Laid-Open No. 2005-275644 (herein after referred to as Patent Document 1) and Japanese Patent Laid-Open No. 2006-301864 (herein after referred to as Patent Document 2) disclose a display apparatus, which has an optical position detection function implemented by light receiving devices embedded in a display panel to serve as devices for detecting the position of a command, as a display apparatus adopting a command-position detection method not requiring a touch panel.

Most optical position detection methods are a technique of making use light receiving devices to detect a shade casted by external light. On the other hand, the display apparatus disclosed in Patent Document 2 employs light receiving devices sensitive to invisible light on the liquid-crystal display panel or (the organic EL display panel) of the display apparatus. In the following description, such a light receiving device is referred to as an optical sensor which is included in an optical-sensor section. In the case of a display apparatus employing a liquid-crystal display panel, a backlight is provided on a particular one of the main surfaces of the liquid-crystal display panel. In the following description, the particular main surface is referred to as the rear surface of the liquid-crystal display panel. Light generated by the backlight includes visible light and invisible light components. When the light generated by the backlight is passing through the liquid-crystal display panel, a liquid-crystal layer of the liquid-crystal display panel modulates the visible light component in accordance with an input video signal before the light is radiated from the other main surface of the liquid-crystal display panel. In the following description, the other main surface is referred to as the front surface of the liquid-crystal display panel. The modulated visible light component of the radiated light is seen as a display image determined in advance by the input video signal.

If a body (such as a finger of the user or a stylus pen) is coming into contact with the front surface of the liquid-crystal display panel or approaching the front surface, some of the radiated light is reflected by the body, which is referred to hereafter as a detection subject or a subject of detection, and guided to some of the optical sensors. The optical sensors detect mainly the invisible light component of the reflected light coming from the detection subject. Thus, the position of the detection subject can be determined from the locations of the optical sensors which detect the invisible light component of the reflected light. For each area in which an optical sensor is created, a visible-light shielding filter (that is, an invisible-light passing filter) is provided. In addition, in such an area, the invisible light component of the light generated by the backlight is not modulated in accordance with an input video signal but merely passed on by the invisible-light passing filter as passing light. Since the optical sensors detect mainly the invisible light component of the reflected light coming from the detection subject and the invisible light component does not contribute to the display, the process to detect the detection subject does not affect the state of the display and is not affected by the degree of brightness of the environment surrounding the display apparatus. By using a large number of optical sensors which are laid out regularly (that is, discretely and two-dimensionally), it is possible to detect the size of the detection subject as well as the position of the detection subject.

An organic EL display apparatus does not desire a backlight because the pixel sections employed in the display apparatus are capable of emitting light by themselves. In the case of an organic EL display apparatus, light emitting devices and light receiving devices are laid out in the display area of the display panel at intervals determined in advance. The technique adopted by the organic EL display apparatus to serve as a technique for detecting a detection subject is identical with that adopted by the liquid-crystal display apparatus. That is to say, a detection subject reflects invisible light radiated from light emitting devices. Then, differences of the amount of the reflected invisible light are detected by a plurality of light receiving devices, which are laid out discretely and two-dimensionally, in order to determine the position and/or size of the detection subject.

In a display apparatus disclosed in Patent Document 1, optical sensors are provided on the backlight side of spacers separating liquid-crystal layers from each other for every pixel section. In addition to an area allocated to an optical sensor, every pixel section has an area allocated to a light receiving device and a light modulation area. Also referred to hereafter as a visible-light sensor, the light receiving device is sensitive to visible light. The light modulation area is an area for modulating passing light by changing a voltage applied to a liquid-crystal layer in accordance with a video signal.

The display apparatus disclosed in Patent Document 1 is configured to be capable of detecting both the visible and invisible light components of light reflected by a detection subject such as a finger of the user or a stylus pen.

In accordance with the technologies described in Patent Documents 1 and 2, a subject of detection is detected by making use of invisible light without affecting the displayed image because the invisible light may not be sensed by human eyes. Thus, even at a black display time at which the amount of passing visible light originating from the backlight, arriving at the rear surface of the display panel and leaving the display panel from the front surface of the panel is about zero as is the case of a black screen display, the subject of detection can be detected. This is because invisible light not affecting the displayed image is radiated from the front surface and reflected back by the subject of detection.

SUMMARY OF THE INVENTION

Incidentally, some of light generated by a backlight or generated by devices embedded in a display panel is reflected while the light is entering and leaving the surfaces of some optical components and/or some stacked films repeatedly in a process to optically detect a body serving as a detection subject coming into contact with the display surface of the display panel or approaching the display surface. The reflected light is further reflected by a layer such as a metallic layer, becoming stray light. The stray light is not light directly arriving at the rear surface of a light receiving device from a backlight which serves as a light radiating section. Instead, the stray light is light obtained as a result of reflections repeated within the display panel. That is to say, the stray light is light hitting the light receiving device without being reflected by a subject of detection. The light directly arriving at the rear surface of a light receiving device from a backlight and the stray light are noise components of detected light which is light reflected by a subject of detection. Such noise components deteriorate the precision of a process to detect the subject of detection. To put it concretely, such noise components decrease the S/N ratio.

In a display apparatus employing a backlight, a light shielding layer is provided to cover the backlight-side surface of each light receiving device as shown in a model diagram of FIG. 1 included in Patent Document 1. As a typical alternative, a gate-electrode layer can be used to serve also as a light shielding layer. With such a light shielding layer, it is possible to prevent light from directly arriving at the rear surface of a light receiving device from a backlight or to reduce the amount of such light.

However, stray light is light propagating around in the inside of the display panel and arriving at a light receiving device before reaching the detection subject outside the display panel in a process to pass through the display panel. Thus, by merely making use of a light shielding layer and/or a gate-electrode layer to serve as an optical shield, it may be impossible to adequately prevent stray light serving as a noise component from hitting a light receiving device.

In the case of the display apparatus disclosed in Patent Documents 1 and 2, light generated by the light radiation section such as a backlight does not well reach a detection subject, which is coming into contact with the front surface of the display panel or approaching the display panel, in a process to detect the subject of detection. That is to say, some of the light generated by a light radiation section becomes stray light. Thus, the efficiency of the utilization of the light is low. In addition, since the ratio of the amount of stray light arriving at a light receiving device as a noise component to the amount of light reflected by the subject of detection to the light receiving device is high, the S/N ratio is reversely low.

These shortcomings are not peculiar to the liquid-crystal display apparatus disclosed in Patent Documents 1 and 2 but also observed in other display apparatus such as an organic EL display apparatus and a display apparatus adopting the electrophoretic method.

Addressing the problems described above, inventors of the embodiment of the present invention have innovated a display apparatus capable of increasing the detection-time S/N ratio by raising the efficiency of the utilization of light, which is generated by a light radiating section, in a process to detect a subject of detection.

A display apparatus implemented by a first embodiment according to a mode of the present invention employs a display section, a light radiating section, a plurality of light converging lenses and a plurality of light receiving devices.

The display section includes pixel areas and sensor areas. Regularly arranged in the display section, the pixel areas are each an area in which a pixel section is created. Regularly arranged in the display section in the same way as the pixel areas, the sensor areas are each an area in which one of the light receiving devices is created.

Located on a particular side of the display section, the light radiating section is a section for outputting light and radiating the output light to said display section from a particular-side surface of the display section.

Each of the light converging lenses is created in one of the sensor areas each located in the display section. A light converging lens converges light generated by the light radiating section on a focal point inside the display section and passes on the converged light to the other-side surface of the display section.

Much like the light converging lenses, each of the light receiving devices is created in one of the sensor areas to serve as a device for receiving light which arrives at the other-side surface of the display section as light reflected by a subject of detection.

A display apparatus implemented by a second embodiment according to another mode of the present invention has characteristics described below in addition to the characteristics of the display apparatus implemented by the first embodiment of the present invention.

In the display apparatus implemented by the second embodiment of the present invention, each of the sensor areas includes any individual one of the light receiving devices; a read circuit provided for the individual light receiving device; a plurality of wire layers including a voltage supply line and a signal line which are provided for the individual light receiving device and the read circuit; and an opening section including neither the light receiving devices nor the wire layers, and any individual one of the light converging lenses is created in any specific one of the sensor areas and the light converging lenses are laid out in such a way that the center optical axis of the individual light converging lens passes through the opening section of the specific sensor area.

A display apparatus implemented by a third embodiment according to a further mode of the present invention has characteristics described below in addition to the characteristics of the display apparatus implemented by the first embodiment of the present invention.

In the display apparatus implemented by the third embodiment of the present invention, each of the sensor areas includes any individual one of the light receiving devices; a read circuit provided for the individual light receiving device; a plurality of wire layers including a voltage supply line and a signal line which are provided for the individual light receiving device and the read circuit; and an opening section including neither the light receiving devices nor the wire layers, and any individual one of the light converging lenses is created in one of the sensor areas and the light converging lenses are laid out in such a way that the focal point of the individual light converging lens coincides with a portion corresponding to the opening section in hierarchical layers including the wire layers embedded therein.

A display apparatus implemented by a fourth embodiment according to a still further mode of the present invention has a characteristic described below in addition to the characteristics of the display apparatus implemented by the first embodiment of the present invention.

In the display apparatus implemented by the fourth embodiment of the present invention, each of the light receiving devices is an optical sensor which is sensitive to invisible light.

A display apparatus implemented by a fifth embodiment according to a still further mode of the present invention has a characteristic described below in addition to the characteristics of the display apparatus implemented by the first embodiment of the present invention.

In the display apparatus implemented by the fifth embodiment of the present invention, each of the light converging lenses is created at a location associated merely with one of the light receiving devices.

A display apparatus implemented by a sixth embodiment according to a still further mode of the present invention has characteristics described below in addition to the characteristics of the display apparatus implemented by the first embodiment of the present invention.

In the display apparatus implemented by the sixth embodiment of the present invention, a plurality of the light converging lenses are created to form lens arrays; and each of the light converging lenses in each of the lens arrays is created at a location corresponding to one of the sensor areas.

A display apparatus implemented by a seventh embodiment according to a still further mode of the present invention has characteristics described below in addition to the characteristics of the display apparatus implemented by the first embodiment of the present invention.

In the display apparatus implemented by the seventh embodiment of the present invention, a plurality of the light converging lenses are created to form lens arrays, that is, a first lens array and a second lens array; each of the light converging lenses in the second lens array is created at a location corresponding to one of the sensor areas to serve as a lens having a focal point in the display section; and each of the light converging lenses in the first lens array is created at a location corresponding to one of the sensor areas to serve as a lens having a focal distance longer than the focal distance of each of the light converging lenses created in the second lens array.

A display apparatus implemented by an eighth embodiment according to a still further mode of the present invention has characteristics described below in addition to the characteristics of the display apparatus implemented by the first embodiment of the present invention.

In the display apparatus implemented by the eighth embodiment of the present invention, the display apparatus has color filters each capable of passing on light having a color selected from a plurality of colors; in each of the pixel areas, a plurality of pixel sections are created to serve as pixel sections each dedicated to one of the colors each associated with one of the color filters; in each of the sensor areas, an optical sensor sensitive to invisible light is created to function as one of the light receiving devices; and on each display line of the display section, one of the sensor areas is created repetitively every few pixel areas so that the ratio of the number of aforementioned sensor areas created on the display line to the number of aforementioned pixel areas created on the same display line is equal to a fraction determined in advance.

The display apparatus each implemented by one of the first to eighth embodiments to serve as an apparatus having one of the configurations described above exhibit the following effects.

Light generated by the light radiating section enters the display section by way of a surface provided on a specific side of the display section to serve as a surface of the display section and is radiated to the display section. In the display section, pixel areas in each of which a pixel section is created are arranged regularly and, by the same token, sensor areas in each of which a light receiving device is created are also arranged regularly as well. The generated light is thus radiated to the pixel areas and the sensor areas. Since each of a plurality of light converging lenses is created on the surface on the specific side of the display section, however, some of the radiated light is converged by the light converging lenses on the focal positions of the lenses in the display section. That is to say, since each of the light converging lenses is provided at a location corresponding to any specific one of the sensor areas, a light beam radiated to the specific sensor area hits the light converging lens provided for the specific sensor area before propagating to the specific sensor area, having the radius thereof squeezed.

In accordance with the second embodiment for example, any individual one of the light converging lenses is created in any specific one of the sensor areas in such a way that the center optical axis of the individual light converging lens passes through the opening section of the specific sensor area. Thus, the focal point of the light beam having a squeezed radius is positioned in the center optical axis of the individual light converging lens. Since the opening section does not include the wire layers, the light converging efficiency is high. In addition, since the focal point is squeezed in the opening section, there is no light component becoming stray light as a result of light reflections by wire layers or the like, or the number of such light components can be minimized.

In accordance with the third embodiment, on the assumption that a light component becoming stray light is generated as a result of light reflections by wire layers or the like, any individual one of the light converging lenses is created by determining the shape and material of the individual light converging lens in one of the sensor areas laid out in such a way that the focal point of the individual light converging lens coincides with a portion corresponding to the opening section in hierarchical layers including the wire layers embedded therein.

The second and third embodiments are more desirable than the first embodiment. This is because, even in the case of the first embodiment which has a focal area wider than those of the second and third embodiments, each of the light converging lenses converges light on the focal position of the lens in the display section. Thus, the second and third embodiments are capable of squeezing the radius of a converged light beam in a space having no wire layers and the like. As a result, in the case of the second and third embodiments, there is no light component becoming stray light as a result of light reflections by wire layers or the like, or the number of such light components can be minimized.

In the first to third embodiments, the radius of a converged light beam is once squeezed in the display section so that the light beam well propagating through the display section is capable of reaching the other-side surface of the display section almost without reducing the amount of the converged light and radiated from the other-side surface of the display section.

A body coming into contact with the other-side surface of the display section or approaching the other-side surface reflects light radiated from the other-side surface back to the same surface. In the following description, such a body is referred to as a subject of detection or a detection subject. When a detection subject such as a finger of the user or a stylus pen is coming into contact with the other-side surface of the display section or approaching the other-side surface, the subject of detection reflects light radiated from the other-side surface back to the same surface. The light reflected by the subject of detection again enters the inside of the display section as reflected light.

The reflected light propagates in the display section over an area normally wider than the size of the subject of detection in accordance with the shape of the subject of detection or in accordance with light components reflected by the wire layers or the like as components of the reflected light. Some of the reflected light arrives at least one light receiving device close to the subject of detection. Any light receiving device hit by the reflected light outputs a signal having a magnitude representing the amount of the reflected light received by the device.

If merely one light receiving device is hit by the reflected light, the position of the detection subject can be determined from the location of the light receiving device.

If a plurality of light receiving device are hit by the reflected light, on the other hand, the position of the detection subject can be determined from the location of a light receiving device outputting a signal having a largest magnitude among all the light receiving devices hit by the reflected light and, in addition, the size of the detection subject can be determined from the locations of all the light receiving devices hit by the reflected light.

In the process to detect a subject of detection as described above, the effect of the light converging lenses prevents generation of light components becoming stray light or reduces the number of such light components. Thus, the transmission efficiency of light in any of sensor areas including a sensor area close to the subject of detection is raised. As a result, the S/N ratio of a signal output by a light receiving device hit by light reflected by the subject of detection to serve as a signal having a magnitude representing the amount of the reflected light is good. This is because the stray light is noises existing in addition to the reflected light.

In accordance with the fourth embodiment, each light receiving device is an optical sensor which is sensitive to invisible light. Thus, even if each of the sensor areas is shielded from visible light generated by the light radiating section, each of the sensor areas still outputs invisible light through the other-side surface of the display section. Since the output invisible light is not recognized by human eyes, however, the invisible light does not have an effect on a display appearing on the screen. Even if light hitting a light receiving device is a mixture of visible light and invisible light, the fact that the light receiving device is an optical sensor sensitive to invisible light is dependent on the fact that the transmission efficiency of light in any of sensor areas including a sensor area close to the subject of detection is high and, conversely, the fact that the transmission efficiency of light in any of sensor areas including a sensor area close to the subject of detection is high is also dependent on the fact that the light receiving device is an optical sensor sensitive to invisible light. Thus, the S/N ratio of a signal output by the optical sensor serving as a light receiving device is further raised to a value higher than that of a case in which light converging lenses are provided and the light receiving device has a peak of sensitivity to visible light.

In accordance with the fifth embodiment, each of the light converging lenses is created to serve as a lens associated with one of the light receiving devices. In accordance with the sixth embodiment, the light converging lenses are created to form a plurality of lens arrays. In accordance with the seventh embodiment, a light converging lens is created for each of the pixel areas.

In the seventh embodiment, the light converging lenses are created to form a plurality of lens arrays, that is, a first lens array and a second lens array. Each of the light converging lenses in the second lens array is created at a location corresponding to one of the sensor areas to serve as a lens having a focal point in the display section. On the other hand, each of the light converging lenses in the first lens array is created at a location corresponding to one of the sensor areas to serve as a lens having a focal distance longer than the focal distance of each of the light converging lenses in the second lens array.

In accordance with the eighth embodiment, on each display line of the display section, one of the sensor areas is created repetitively every few pixel areas so that the ratio of the number of aforementioned sensor areas created on the display line to the number of aforementioned pixel areas created on the same display line is equal to a fraction determined in advance.

In accordance with the display apparatus provided by the embodiment of the present invention, it is possible to increase the utilization of light generated by the light radiating section to serve as light used for detecting a subject of detection and, hence, possible to improve the S/N ratio of a signal representing received light reflected by the subject of detection.

BRIEF DESCRIPTION OF THE DRAWINGS

FIG. 6 is a cross-sectional diagram roughly showing cross sections of portions of an optical sensor section 1 and a pixel section PIX which are provided in accordance with the embodiment of the present invention;

DETAILED DESCRIPTION OF THE PREFERRED EMBODIMENT

By referring to diagrams, the following description explains an embodiment provided by the present invention to serve as an embodiment mainly implementing a typical liquid-crystal display apparatus. The embodiment according to the present invention implements a liquid-crystal display apparatus of the so-called transmission type in which light radiated to the rear surface of a display section of the display apparatus is emitted from the front surface of the display section to serve as display light. The rear surface of the display section is a surface on a side opposite to the side of the front surface emitting display light. For this reason, in the following description, the liquid-crystal display apparatus is presumed to be a transmission-type liquid-crystal display apparatus which is the liquid-crystal display apparatus of the transmission type.

Overall Configuration

Figure 1:
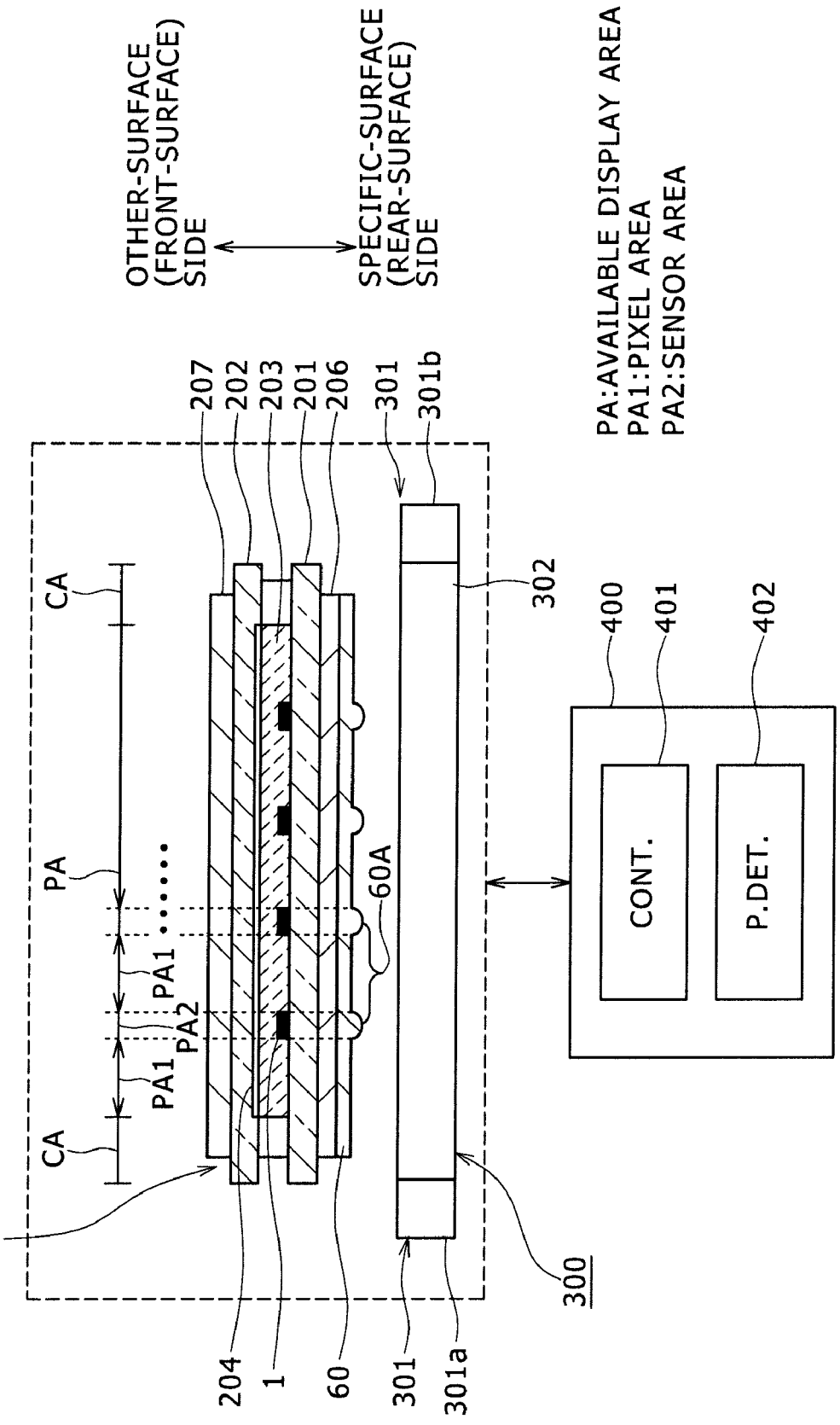
FIG. 1 is a cross-sectional diagram roughly showing a cross section of the entire configuration of a transmission-type liquid-crystal display apparatus according to an embodiment of the present invention.

FIG. 1 is a cross-sectional diagram roughly showing a cross section of the entire configuration of a transmission-type liquid-crystal display apparatus 100. The transmission-type liquid-crystal display apparatus 100 with its configuration shown in the cross-sectional diagram of FIG. 1 employs a liquid-crystal panel 200 functioning as a display section, a backlight 300 functioning as a light radiating section and a data processing section 400.

As shown in the cross-sectional diagram of FIG. 1, the liquid-crystal panel 200 has a TFT (Thin Film Transistor)-array substrate 201, a color-filter substrate 202 serving as the so-called facing substrate facing the TFT-array substrate 201 through a gap and a liquid-crystal layer 203 provided in the gap. With the liquid-crystal layer 203 taken as a center, in the following description, the lower side in the direction of the thickness of the liquid-crystal panel 200 is referred to as a specific-surface side or a rear-surface side whereas the upper-surface side is referred to as a front-surface side or the other-side surface.

The TFT-array substrate 201 and the color-filter substrate 202 are separated away from each other by the gap cited above so that the TFT-array substrate 201 and the color-filter substrate 202 face each other through the gap. The liquid-crystal layer 203 is created in the gap sandwiched by the TFT-array substrate 201 and the color-filter substrate 202. In addition, a pair of orientation films not shown in the cross-sectional diagram of FIG. 1 are created to serve as films each used for making orientation directions of molecules of liquid-crystal layer 203 uniform.

A color-filter layer 204 is created on a surface on one side of the color-filter substrate 202, being sandwiched between the color-filter substrate 202 and the liquid-crystal layer 203.

In the liquid-crystal panel 200, a first polarization board 206 is created beneath the TFT-array substrate 201 whereas a second polarization board 207 is created on the color-filter substrate 202. That is to say, the first polarization board 206 is created on the rear-surface side of the TFT-array substrate 201 whereas a second polarization board 207 is created on the front-surface side of the color-filter substrate 202.

On the front-surface side (or the other side) of the TFT-array substrate 201, optical sensor sections 1 are provided as shown in the cross-sectional diagram of FIG. 1. As will be described later in detail, each of the optical sensor sections 1 employs an optical sensor serving as a light receiving device and a read circuit for reading a signal generated by the optical sensor to serve as a signal representing light detected by the optical sensor.

Each of the optical sensor sections 1 is created in order to provide the function of the so-called touch panel inside the liquid-crystal panel 200. If the liquid-crystal panel 200 is seen from a position above the liquid-crystal panel 200 or a position on the front-surface side of the liquid-crystal panel 200, the optical sensor sections 1 appear to be laid out regularly in an available display area PA of the liquid-crystal panel 200.

FIG. 1 is thus a cross-sectional diagram roughly showing a cross section of the entire configuration of a transmission-type liquid-crystal display apparatus 100 employing a liquid-crystal panel 200 having optical sensor sections 1 laid out to form a matrix on the available display area PA of the liquid-crystal panel 200. As shown in the cross-sectional diagram of FIG. 1, a plurality of optical sensor sections 1 are provided. In the typical configuration shown in the cross-sectional diagram of FIG. 1, five optical sensor sections 1 are provided. In actuality, however, in order to determine the position of a detection subject, much more than five optical sensor sections 1 need to be laid out in each direction on the TFT-array substrate 201. In order to make the cross-sectional diagram of FIG. 1 simple, nevertheless, the number of optical sensor sections 1 shown in the diagram is reduced to 5. If positions each to be determined as the position of a detection subject are limited to merely positions in a portion of the available display area PA, the optical sensor sections 1 are laid out regularly in the portion of the available display area PA.

The area of available display area PA on the display surface (or the front surface) of the liquid-crystal panel 200 includes sensor areas PA2 and pixel areas PA1 other than the sensor areas PA2 as shown on the top line of the cross-sectional diagram of FIG. 1. In each of the sensor areas PA2, an optical sensor section 1 is created. In each of the pixel areas PA1, on the other hand, a plurality of pixel sections each provided for one of colors different from each other are created. For example, in each of the pixel areas PA1, three pixel sections for red (R), green (G) and blue (B) colors respectively are provided. The color of a pixel section is determined by the color of a color filter provided on the color-filter layer 204 to serve as a color filter associated with the pixel section.

In each of the pixel areas PA1 each allocated to a plurality of pixel sections, a pixel electrode and a common electrode facing the pixel electrode are created for each of the pixel sections even though the pixel electrode and the common electrode themselves are not shown in the cross-sectional diagram of FIG. 1. Also referred to hereafter as a facing electrode, the common electrode is an electrode common to all pixel sections. Each of the pixel section and common electrodes is made from a transparent electrode material. In a typical configuration, on the other-side surface (that is, the side close to the liquid-crystal layer 203) of the TFT-array substrate 201, the common electrode facing the pixel electrodes is created to serve as a common electrode common to all pixel sections. In this configuration, the pixel electrodes are created on the other side of the liquid-crystal layer 203, sandwiching the liquid-crystal layer 203 in conjunction with the pixel electrodes. In an alternative configuration, the pixel electrodes are reversely created on the other-side surface (that is, the side close to the liquid-crystal layer 203) of the TFT-array substrate 201 whereas the common electrode is created on the other side of the liquid-crystal layer 203 to serve as an electrode common to all pixel sections, sandwiching the liquid-crystal layer 203 in conjunction with the pixel electrodes.

Depending on the configuration of the pixel section, the layout area of the pixel section may include a switching device created to serve as a switching device for controlling an electric potential applied to a supplementary capacitor supplementing the liquid-crystal capacitor between the pixel and facing electrodes and an electric potential applied to the pixel electrode in accordance with the electric potential of an input video signal. It is to be noted, however, that the switching device itself is not shown in the cross-sectional diagram of FIG. 1.

A pixel unit is defined as a unit including a plurality of pixel sections each created for one of the same plurality of colors. In this case, with the ratio of the number of optical sensor sections 1 to the number of pixel units set at 1:1, the layout density of the optical sensor sections 1 laid out on the TFT-array substrate 201 reaches a maximum value. In the embodiment, the layout density of the optical sensor sections 1 may be equal to or smaller than the maximum value.

The backlight 300 is placed on the rear-surface side of the TFT-array substrate 201. The backlight 300 faces the rear surface of the liquid-crystal panel 200 and radiates illumination light to the available display area PA of the liquid-crystal panel 200.

The backlight 300 shown in the cross-sectional diagram of FIG. 1 has light sources 301 and a light guiding board 302 for converting the light radiated by the light sources 301 into planar light by spreading the radiated light. In accordance with the position of the light sources 301 relative to the light guiding board 302, the backlight 300 may have a side-light type and a right-below type. In the case of the embodiment, the backlight 300 is assumed to be a backlight of the side-light type.

The light sources 301 are placed behind the liquid-crystal panel 200 in one or both of directions spread over the rear surface of the liquid-crystal panel 200. That is to say, the light sources 301 are placed at locations along one side (or two facing sides) of the liquid-crystal panel 200 seen from a position above the front surface of the liquid-crystal panel 200. However, the light sources 301 can also be placed at locations along three or more sides of the liquid-crystal panel 200.

Each of the light sources 301 is typically a cold cathode tube lamp. To put it concretely, each of the light sources 301 converts an ultraviolet ray generated in an arc discharging phenomenon occurring in low pressure mercury vapor inside a glass tube into a visible light beam by making use of a fluorescent material, and radiates the visible light beam. It is to be noted, however, that each of the light sources 301 does not have to be a cold cathode tube lamp. For example, each of the light sources 301 can also be an LED or EL device.

In the case of this embodiment, each of the light sources 301 is an LED. The cross-sectional diagram of FIG. 1 shows a transmission-type liquid-crystal display apparatus 100 employing a pair of a visible light source 301a such as a white-color LED and an IR (Infrared) light source 301b for generating invisible light. The visible light source 301a and the IR light source 301b are placed on two mutually facing sides of the liquid-crystal panel 200.

The light guiding board 302 is typically an acryl board capable of transmitting light. While reflecting all light generated by the light sources 301, the light guiding board 302 guides the light over the surface of the light guiding board 302. That is to say, the light guiding board 302 guides the light from one side of a direction over the rear surface of the liquid-crystal panel 200 to the other side. On the rear surface of the light guiding board 302, a dot pattern not shown in the cross-sectional diagram of FIG. 1 is created. Having a plurality of protrusions, the dot pattern is typically integrated with the light guiding board 302 or made of a material separately from the light guiding board 302. The light guided by the light guiding board 302 is dispersed by the dot pattern before being radiated to the liquid-crystal panel 200. It is to be noted that, on the rear-surface side of the light guiding board 302, a light reflecting sheet for reflecting light can be provided, whereas, on the front-surface of the light guiding board 302, a light dispersing sheet or a prism sheet can be provided.

Since the backlight 300 has the configuration described above, the backlight 300 is capable of radiating planar light to the entire available display area PA of the liquid-crystal panel 200 all but uniformly.

One of prominent characteristics of the embodiment is that the embodiment has a lens array 60 including light converging lenses 60A each used for converging light hitting the lens 60A on the position of an optical sensor section 1 associated with the lens 60A. Made of an organic or inorganic material, each of the light converging lenses 60A is placed at a position corresponding to an optical sensor section 1 or a position corresponding to a sensor area PA2. The lens arrays 60 each including a plurality of light converging lenses 60A form a matrix of aforementioned light converging lenses 60A. Each of portions included in a lens array 60 as a portion placed at a location corresponding to a pixel area PA1 is typically made of parallel planar boards which has no lens function but has a high optical transmissivity.

Each of the lens arrays 60 is created by fabricating or deforming a film typically made of an organic material. As an alternative, each of the lens arrays 60 is created by laminating a plurality of films each typically made of an inorganic material. In the case of a lens array 60 created by laminating a plurality of such films, the films are desired to have refraction indexes different from each other, and at least a specific film in the middle of the stack has to be fabricated into the shape of a lens in order to create a light converging lens 60A. The organic material can be the acryl, a polyimide or the like whereas the inorganic material can be the silicon oxide ($SiO_2$), the silicon nitride (SiN) or the like.

It is to be noted that, as will be described later, a light converging lens 60A can be created at a position corresponding to a pixel area PA1 as well as at a position corresponding to a sensor area PA2. As an alternative, a lens array 60 is created to overlap another lens array 60 having light converging lenses each placed merely at a position corresponding to a pixel area PA1.

In the liquid-crystal panel 200 shown in the cross-sectional diagram of FIG. 1, every light converging lens 60A is created merely at a position corresponding to a sensor area PA2 merely because it is desirable to increase the optical transmissivity of the liquid-crystal panel 200. Later description will describe details of the fact that every light converging lens 60A is created merely at a position corresponding to a sensor area PA2 because it is desirable to increase the optical transmissivity of the liquid-crystal panel 200.

As shown in the cross-sectional diagram of FIG. 1, the data processing section 400 employs a control section 401 and a position detecting section 402. The data processing section 400 is implemented as a computer which executes a program for controlling a variety of sections. Stored in advance in a memory not shown in the cross-sectional diagram of FIG. 1, the program is executed to implement the functions of the control section 401 and the position detecting section 402. As an alternative, tasks of the program are loaded from an external source along with data desired in the execution of the program.

As another alternative, the functions of the data processing section 400 are distributed to processors internal and external to the liquid-crystal panel 200. In the transmission-type liquid-crystal display apparatus 100 shown in the cross-sectional diagram of FIG. 1, the data processing section 400 is a processor external to the liquid-crystal panel 200. An example of the external processor is an IC chip or a plurality of IC chips.

The control section 401 is a section for controlling an operation to display an image, the operations of optical sensors (or IR (Infrared) sensors) for determining the position of a detection subject and the operations of the backlight 300.

With regard to the operation to display an image, the control section 401 typically outputs a control command to a display driving circuit employed in the liquid-crystal panel 200 in order to control the operation to display an image. As for the operations of the IR sensors, the control section 401 typically issues a control command to a sensor driving circuit employed in the liquid-crystal panel 200 in order to control of operations to determine the position (and the size) of the detection subject. The display driving circuit and the sensor driving circuit will be described later.

With regard to the operations of the backlight 300, the control section 401 issues a control command to the power-supply section (not in shown in the cross-sectional diagram of FIG. 1) of the backlight 300 in order to control attributes (such as the brightness) of radiated light generated by the backlight 300.

In accordance with a command received from the control section 401, the position detecting section 402 acquires received-light data from the liquid-crystal panel 200 through a sensor driving circuit employed in the liquid-crystal panel 200 and, on the basis of received-light data, determines the position of a detection subject which is coming into contact with the available display area PA of the liquid-crystal panel 200 or approaching the available display area PA. Examples of the detection subject are a finger of the user and a stylus pen.

Rough Configuration of the Liquid-Crystal Panel

Figure 2:
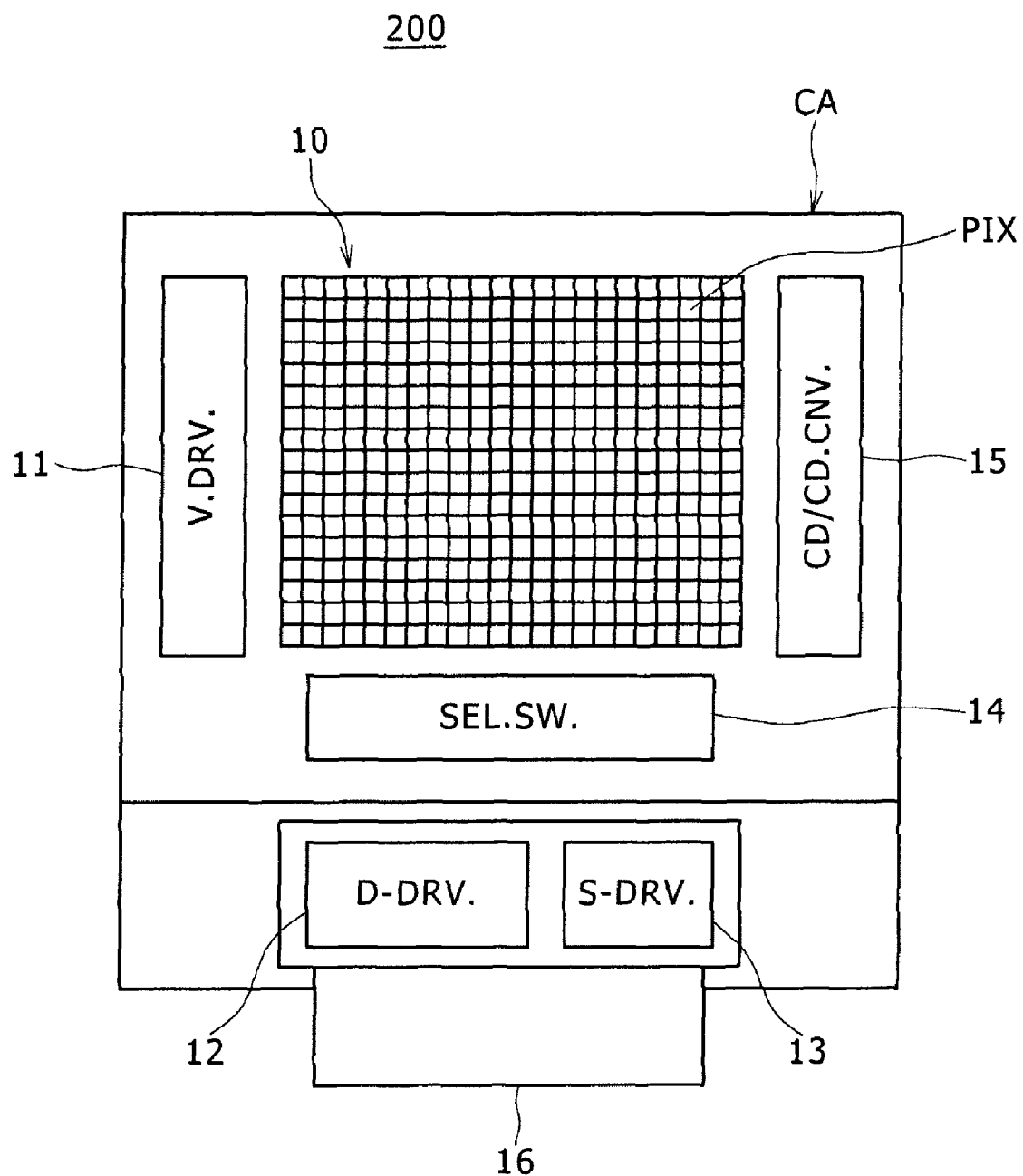
FIG. 2 is a block diagram showing a typical configuration of driving circuits employed in a liquid-crystal panel of the transmission-type liquid-crystal display apparatus according to the embodiment of the present invention.

FIG. 2 is a block diagram showing a typical configuration of driving circuits employed in the liquid-crystal panel 200.

As shown in the block diagram of FIG. 2, the liquid-crystal panel 200 employs a display section 10 on which pixel sections PIX are laid out to form a matrix. Also as shown in the cross-sectional diagram of FIG. 1, a peripheral area CA exists, surrounding the available display area PA including pixel areas PA1 corresponding to the display section 10. The peripheral area CA is the area other than the available display area PA of the TFT-array substrate 201. As shown in the block diagram of FIG. 2, in the peripheral area CA, some driving circuits each shown as a functional block including TFTs (Thin Film Transistors) are created. The TFTs in the driving circuits are created in the same TFT-array substrate 201 as TFTs created in the available display area PA.

The driving circuits created in the peripheral area CA of the liquid-crystal panel 200 include a vertical driver (V.DRV.) 11, a display driver (D-DRV.) 12, a sensor driver (S-DRV.) 13, a select-switch array (SEL.SW.) 14 and a DC/DC converter (DC/DC.CNV.) 15.

The vertical driver 11 is a circuit having the function of a shift register and functions of other components. The shift register is a register for carrying out a vertical scanning operation on a plurality of control lines, which are each stretched in the horizontal direction, in order to select a pixel line corresponding to pixel sections laid out in a horizontal line along a row of the matrix. Control lines of different kinds are subjected to the vertical scanning operation.

The display driver 12 is a circuit having functions such as a function to sample a data electric potential of a video signal, generate a data signal amplitude on the basis of the sampled data electric potential and assert the data signal amplitude on a signal line connected to pixel sections arranged in the vertical direction along a column of the matrix.

The sensor driver 13 is a circuit for carrying out a vertical scanning operation on a plurality of other control lines, which are each connected to optical sensor sections 1 laid out in a horizontal line along a row of the matrix, in the same way as the vertical scanning operation carried out by the vertical driver 11, in order to collect data from the optical sensor sections 1 in synchronization with the vertical scanning operation carried out by the vertical driver 11. Each of the optical sensor sections 1 is placed in a sensor area PA2 so that the total number of aforementioned optical sensor sections 1 is a fraction of the total number of pixel sections laid out in pixel areas PA1, that is, the density of the optical sensor sections 1 is a fraction of the density of the pixel sections.

Composed of a plurality of TFT switches, the switch array 14 is a circuit for executing the control to assert the data signal amplitude generated by the display driver 12 on a signal line connected to pixel sections arranged in the vertical direction along a column of the matrix formed in the display section 10 and the control to collect data in the sensor driver 13 from optical sensor sections 1 laid out in a horizontal line along a row of the matrix formed in the display section 10.

The DC/DC converter 15 is a circuit for generating a variety of DC voltages of electric potentials, which are desired for driving the liquid-crystal panel 200, from an input power-supply voltage.

Signals input to and output from the display driver 12 and the sensor driver 13 as well as other signals are exchanged with components inside and outside the liquid-crystal panel 200 by way of a flexible substrate 16 provided in the liquid-crystal panel 200.

Components other than those shown in the block diagram of FIG. 2 are included in the driving circuits. Examples of the other components are a component for generating a clock signal and components each used for receiving an input from an external source.

Typical Combination of Pixel Sections and an Optical Sensor Section

As described earlier, pixel sections and optical sensor sections 1 are laid out in the available display area PA regularly. The regularity of the layout is arbitrary. In general, however, a plurality of pixel sections and an optical sensor section 1 form a pixel-section unit and a plurality of such pixel-section units are laid out to form a matrix in the available display area PA. A typical pixel-section unit has three pixel sections, i.e., red, green and blue pixel sections which form a pixel unit as described earlier, and an optical sensor section 1. The following description explains a typical layout including such typical pixel-section units arranged to form a matrix.

A red-color pixel section R, a green-color pixel section G and a blue-color pixel section B form a pixel-section unit.

The color-filter layer 204 shown in the cross-sectional diagram of FIG. 1 has filters for selectively passing light of the R (red), G (green) and B (blue) colors each corresponding to one of different wavelength domains and a black matrix used for shielding the surroundings of the filters from light of mixed colors or masking the boundaries between the filters in order to block the light of mixed colors. Each of the filters has about the same size as a pixel section PIX and the black matrix masks the surroundings (or the boundaries) by black-matrix bars each having a fixed width.

Figure 3:
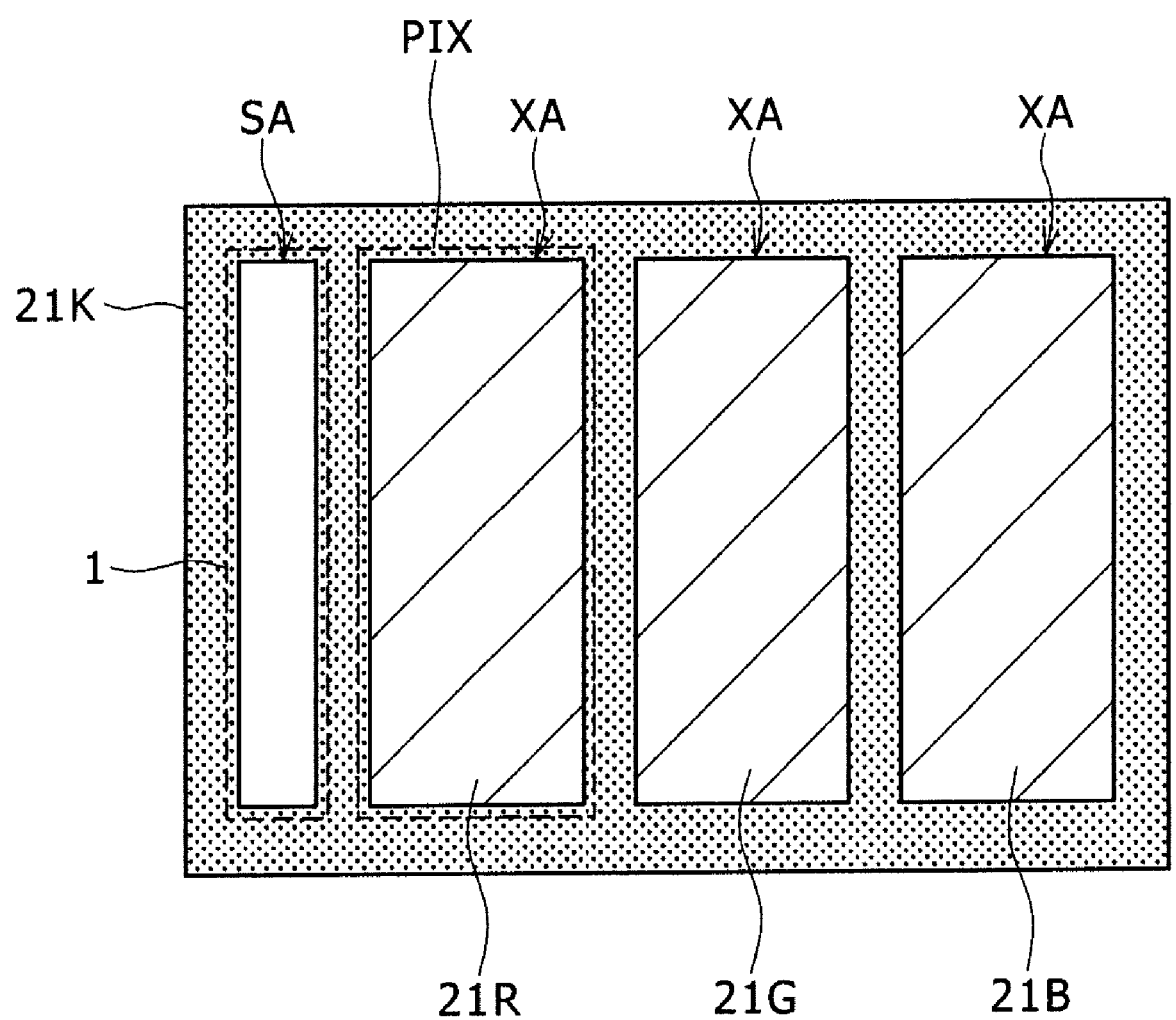
FIG. 3 is a top-view diagram showing a typical pattern of a black matrix 21K according to the embodiment of the present invention.

FIG. 3 is a top-view diagram showing a typical pattern of the black matrix 21K cited above. The typical black matrix 21K shown in the diagram of FIG. 3 has four opening section sections, i.e., one sensor opening section SA and three pixel opening sections XA. In each of the three pixel opening sections XA, one of the three color filters is provided.

To put it in more detail, a red-color filter 21R, a green-color filter 21G and a blue-color filter 21B are laid out one-directionally in the three pixel opening sections XA respectively in the same order as an order in which the red-color filter 21R, the green-color filter 21G and the blue-color filter 21B are enumerated in this statement. A fixed-width vertical bar of the pattern of the black matrix 21K is placed between the red-color filter 21R and the green-color filter 21G and another fixed-width vertical bar of the pattern of the black matrix 21K is placed between the green-color filter 21G and the blue-color filter 21B. That is to say, the red-color filter 21R and the green-color filter 21G are separated away from each other by a vertical bar having a fixed width whereas the green-color filter 21G and the blue-color filter 21B are separated away from each other by another vertical bar having a fixed width.

The three color filters 21R, 21G and 21B are thus located on the same line as pixel sections PIX. Accordingly, the height (or the vertical-direction size) of each of the color filters has a fixed value.

An optical sensor section 1 having the same height as the pixel section PIX is placed in the sensor opening section SA which is close to the pixel opening section XA allocated for the red-color filter 21R or the pixel opening section XA allocated to the blue-color filter 21B. In the case of the typical pattern shown in the diagram of FIG. 3 as a typical pattern of the black matrix 21K, the optical sensor section 1 is placed in the sensor opening section SA which is close to the pixel opening section XA allocated to the red-color filter 21R. In the sensor opening section SA allocated to the optical sensor section 1 in the typical pattern shown in the diagram of FIG. 3 as a typical pattern of the black matrix, no color filter is created. This is because light reflected by a detection subject such as a finger of the user or a stylus pen needs to be radiated to the optical sensor section 1 placed in the sensor opening section SA. A color filter placed in the sensor opening section SA will obstruct such light. If the reflected light to be detected by the optical sensor section 1 is IR (infrared) light (that is, invisible light), an IR filter for selecting and passing on the IR light may be placed in the sensor opening section SA allocated to the optical sensor section 1.

Patterns of Pixel and Optical-Sensor Sections and Cross-Sectional Structure

Figure 4A:
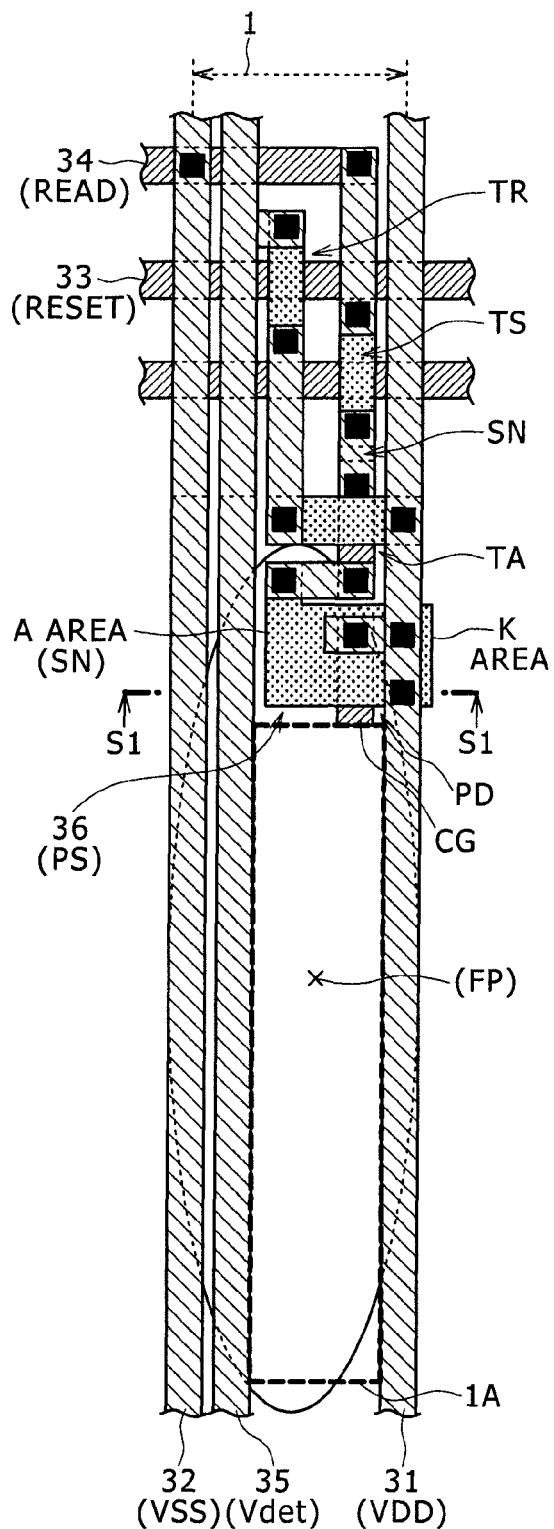
FIG. 4A is a top-view diagram showing a typical top view of the optical sensor section.
Figure 4B:
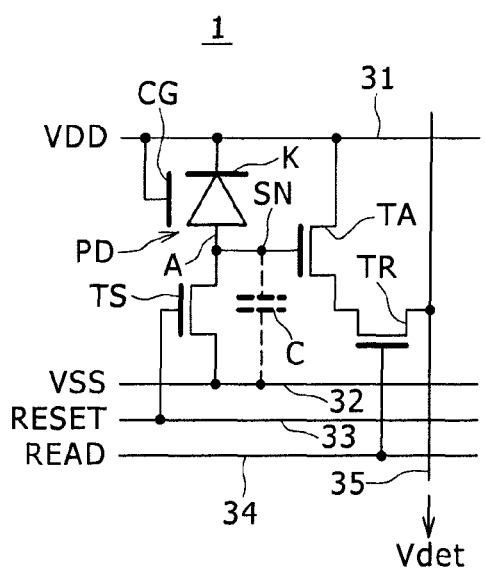
FIG. 4B is a circuit diagram showing an equivalent circuit of the optical sensor section having a pattern shown in the top-view diagram of FIG. 4A.

FIG. 4 is a plurality of diagrams each showing an optical sensor section 1. To be more specific, FIG. 4A is a top-view diagram showing a typical top view of an optical sensor section 1 whereas FIG. 4B is a circuit diagram showing an equivalent circuit of the optical sensor section 1 having a pattern shown in the top-view diagram of FIG. 4A.

The equivalent circuit of the optical sensor section 1 shown in the circuit diagram of FIG. 4B employs three transistors and a photodiode PD. In this case, each of the transistors is an N-channel TFT (Thin Film Transistor). The three N-channel TFTs serve as a select transistor TS, an amplification transistor TA and a read transistor TR respectively.

The photodiode PD is a typical optical sensor which is sensitive to invisible light. The anode A of the photodiode PD is connected to a storage node SN whereas the cathode K of the photodiode PD is connected to a power-supply voltage VDD supply line 31 also referred to hereafter simply as a VDD supply line which is a line for supplying a power-supply voltage VDD to the cathode K (and the drain electrode of the amplification transistor TA as will be described later). As will be described later, the photodiode PD has a PIN structure or a PDN structure. The photodiode PD is provided with a control gate CG for applying an electric field to an I (intrinsic) area or a D (doped) area through an insulation film. The I area is an intrinsic semiconductor area of the PIN structure whereas the D area is an N-area of the PDN structure. The photodiode PD has a structure in which the photodiode PD is used by being reversely biased and, by controlling the degree of depletion through the use of the control gate CG in the state of being reversely biased, the sensitivity to invisible light can be optimized (that is, maximized in most cases).

The drain electrode of the select transistor TS is connected to the storage node SN, its source electrode is connected to a reference voltage VSS supply line 32 also referred to hereafter simply as a VSS supply line which is a line for supplying a reference voltage VSS to the source electrode and the gate electrode thereof is connected to a RESET supply line 33 also referred to hereafter as a reset line which is a line for supplying a reset signal RESET. The select transistor TS turns on to switch the storage node SN from a floating state to a state of being connected to the VSS supply line 32 through the turned-on select transistor TS in order to electrically discharge electric charge stored in (a storage capacitor C connected to) the storage node SN from the storage capacitor C, that is, in order to reset the electric charge stored in (a storage capacitor C connected to) the storage node SN.

The drain electrode of the amplification transistor TA is connected to the VDD supply line 31, its source electrode is connected to an output detection line 35, which is also referred to hereafter simply as a detection line for reading out a detected electric potential Vdet or a detected current Idet, through the read transistor TR and the gate electrode thereof is connected to the storage node SN.

The drain electrode of the read transistor TR is connected to the source electrode of the amplification transistor TA, the source electrode of the read transistor TA is connected to the detection line 35 and the gate electrode of the read transistor TA is connected to the read control signal line 34 also referred to simply as a read control line for supplying a read control signal READ to the gate electrode.

After the electric charge stored (in the storage capacitor C connected to) the storage node SN is reset, the storage node SN is put in a floating state again, being electrically charged with positive electric charge generated by the photodiode PD. The amplification transistor TA is a transistor which operates to amplify a received-light electric potential representing the electric charge stored in (the storage capacitor C connected to) the storage node SN. The read transistor TR is a transistor for controlling a timing with which the received-light electric potential amplified by the amplification transistor TA is asserted on the detection line 35. After the lapse of a predetermined time period to store electric charge in (the storage capacitor C connected to) the storage node SN, the read control signal READ is put in an active state in order to turn on the read transistor TR. With the read transistor TR put in a turned-on state, a voltage is applied between the source and drain electrodes of the amplification transistor TA, causing a current having a magnitude determined by an electric potential appearing on the gate electrode of the amplification transistor TA to flow between the source and drain electrodes of the amplification transistor TA. The electric potential appearing on the gate electrode of the amplification transistor TA is determined by the electric charge stored in (the storage capacitor C connected to) the storage node SN. Thus, an electric-potential change amplified by the amplification transistor TA appears on the detection line 35 in accordance with the received-light electric potential. The electric-potential change is output to a component external to the optical sensor section 1 through the detection line 35 as a detected electric potential Vdet. In an alternative configuration, a detected current Idet with the magnitude thereof varying in accordance with the received-light electric potential is output to a component external to the optical sensor section 1 through the detection line 35.

FIG. 4A is a top-view diagram showing a typical top view of the color-filter substrate 202 and the TFT-array substrate 201 in a state shown in the cross-sectional diagram of FIG. 1 as a state before a process to sandwich the liquid-crystal layer 203 between the color-filter substrate 202 and the TFT-array substrate 201.

In a pattern shown in the top-view diagram of FIG. 4A, reference numerals (and reference notations) each shown in the circuit diagram of FIG. 4B as a numeral (or a notation) used to denote a component are used in the top-view diagram of FIG. 4A as they are so that electrical connections between components shown in the top-view diagram of FIG. 4A are obvious from the circuit diagram of FIG. 4B.

Each of the VDD supply line 31, the VSS supply line 32 and the detection line 35 are created from a wire layer made of aluminum (Al). On the other hand, each of the RESET supply line 33 and the read control line 34 is made of a GM (gate metal) such as molybdenum (Mo). Each of the RESET supply line 33 and the read control line 34 which is made of a GM (gate metal) is provided as a layer below the wire layers each made of aluminum. Four PS (poly-silicon) layers isolated from each other are provided under the Al wire layers but above the GM layers, forming a hierarchy. The select transistor TS, the read transistor TR, the amplification transistor TA and the photodiode PD have the four PS layers respectively.

Each of the select transistor TS, the read transistor TR and the amplification transistor TA has a structure in which impurities of the N conductivity type are injected into the two sides of each intersection existing on a PS layer as an intersection of a GM layer and a PS layer to form the source and drain electrodes of the transistor.

On the other hand, the photodiode PD is created by injection of impurities having two conductivity types opposite to each other into areas on respectively the two sides of a thin-film semiconductor layer 36 which is one of the PS layers. The two conductivity types opposite to each other are the N conductivity type and the P conductivity type. Thus, the photodiode PD has a diode structure. The impurity area doped with injected impurities having the P conductivity type serves as the anode (A) of the photodiode PD or the storage node SN. On the other hand, the impurity area doped with injected impurities having the N conductivity type serves as the cathode (K) of the photodiode PD and the cathode (K) is connected to the VDD supply line 31, which is an upper Al layer, through a contact.

Figure 5:
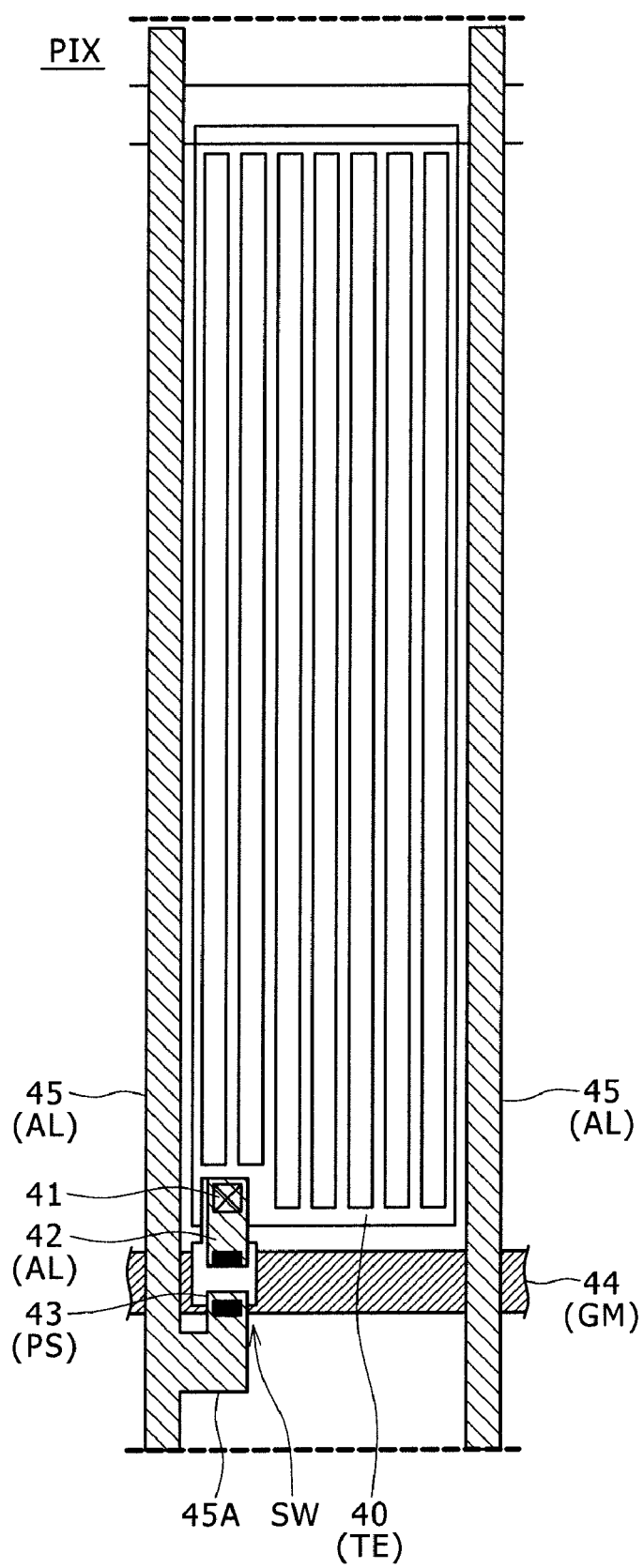
FIG. 5 is a top-view diagram showing the top view of a portion of a TFT-array substrate provided for a pixel section PIX to serve as a TFT-array substrate according to the embodiment of the present invention.

FIG. 5 is a top-view diagram showing the top view of the TFT-array substrate 201 in a pixel section PIX of a liquid crystal adopting an FFS (Field Fringe Switching) method. The liquid crystal adopting the FFS method is also referred to as a liquid crystal adopting an IPS (In Plane Switching)—Pro method.

The top-view diagram of FIG. 5 also shows a pixel electrode 40, a variety of wires, a switching device SW and their connections in addition to the TFT-array substrate 201 which serves as a base.

The pixel electrode 40 is created as a transparent electrode layer TE having a plurality of slits. A common electrode not shown particularly in the top-view diagram of FIG. 5 is created beneath the pixel electrode 40 to serve as an electrode facing the pixel electrode 40. The common electrode is a transparent electrode layer TE common to all pixel sections.

The pixel electrode 40 is connected to an internal wire 42, which is created as a lower Al layer or the like, through a contact 41. The internal wire 42 is connected to one of the source and drain electrodes created on a thin-film semiconductor layer 43 of the switching device SW to serve as electrodes of the switching device SW. The thin-film semiconductor layer 43 itself is made of poly-silicon. The other electrode created on the thin-film semiconductor layer 43 is connected to a signal line 45 which is made of aluminum (Al). A vertical scan line 44 intersecting with an under layer of the thin-film semiconductor layer 43 is made of a GM (gate metal) such as molybdenum (Mo) and provided in an orientation crossing the signal line 45.

It is to be noted that a color-filter substrate 202 not shown in the top-view diagram of FIG. 5 is created above the TFT-array substrate 201 shown in the top-view diagram of FIG. 5 to serve as a substrate including a variety of patterns. A liquid-crystal layer 203 is created between the TFT-array substrate 201 and the color-filter substrate 202 as shown in the cross-sectional diagram of FIG. 1. A second polarization board 207 is created on the color-filter substrate 202 whereas a first polarization board 206 is created beneath the TFT-array substrate 201.

The liquid-crystal layer 203 is composed of nematic liquid crystals. The second polarization board 207 is created cohesively on an outer surface of the color-filter substrate 202, sandwiching an adhesive substance in conjunction with the color-filter substrate 202. By the same token, the first polarization board 206 is created cohesively on an outer surface of the TFT-array substrate 201, sandwiching an adhesive substance in conjunction with the TFT-array substrate 201. The first polarization board 206 and the second polarization board 207, which are created in this way, are provided in a cross-Nicol state.

The GM (gate metal) material used for making the signal line 45 and the vertical scan line 44 can be aluminum (Al), molybdenum (Mo), chrome (Cr), tungsten (W), titan (Ti), lead (Pb), a compound layer composed of a combination of these materials or an alloy layer made of these materials. An example of the compound layer is a Ti/Al layer.

FIG. 6 is a cross-sectional diagram roughly showing cross sections of a portion of an optical sensor section 1 and a portion of a pixel section PIX adopting the FFS method. To be more specific, the cross-sectional diagram of FIG. 6 shows a cross section along an S1-S1 line shown in the top-view diagram of FIG. 4A as a cross section of a portion of an optical sensor section 1 and shows a cross section of a portion of the pixel section PIX shown in the top-view diagram of FIG. 5. However, the pixel section PIX with a cross section thereof shown in the cross-sectional diagram of FIG. 6 does not exactly correspond to the pixel section PIX shown in the top-view diagram of FIG. 5. Instead, the cross-sectional diagram of FIG. 6 shows merely an approximate structure of a pixel section PIX for the sake of convenience.

A cross-sectional structure of an optical sensor section 1 is mainly explained by referring to the cross-sectional diagram of FIG. 6.

As shown in the cross-sectional diagram of FIG. 6, a photodiode PD and the switching device SW employed in a pixel section are created by being embedded in a multi-layer insulation film on the TFT-array substrate 201. The multi-layer insulation film shown in the cross-sectional diagram of FIG. 6 includes a two-layer gate insulation film 50, a two-layer first interlayer insulation film 51, a second interlayer insulation film 52, which is a flattened film, and a third interlayer insulation film 53. The two-layer gate insulation film 50, the two-layer first interlayer insulation film 51, the second interlayer insulation film 52 and the third interlayer insulation film 53 are sequentially piled up in the bottom-up direction in the same order as an order in which the two-layer gate insulation film 50, the two-layer first interlayer insulation film 51, the second interlayer insulation film 52 and the third interlayer insulation film 53 are enumerated in this statement in order to form a laminated stack.

A control gate CG is created right below the two-layer gate insulation film 50 whereas a thin-film semiconductor layer 36 is created on the two-layer gate insulation film 50. The thin-film semiconductor layer 36 includes an I (intrinsic) area above the control gate CG as well as an A (anode) area and a K (cathode) area which are respectively located on both the sides of the I area. The I area is an intrinsic semiconductor area of the PIN structure, the A area is a P+ area whereas the K area is an N+ area. It is to be noted that, in the case of a PDN structure, as a substitute for the I area, a D area is created. The D area is an N− area.

The K area is connected to a VDD supply line 31, which is created on the two-layer first interlayer insulation film 51, by making use of a contact plug 54 created in the two-layer first interlayer insulation film 51. The A area is connected to the gate electrode of the amplification transistor TA at a location as shown in the circuit diagram of FIG. 4B. At locations separated away from the VDD supply line 31 as locations on the two-layer first interlayer insulation film 51, a detection line 35 and a VSS supply line 32 are lined up.

Each of the VDD supply line 31, the VSS supply line 32 and the detection line 35 is made of aluminum (Al) to serve as a wire having a large bump. For this reason, a second interlayer insulation film 52 is created to serve as a film for flattening the large bumps.

On the second interlayer insulation film 52, a common electrode 55 fixed at a common electric potential is created. Such a common electrode 55 is also created on the second interlayer insulation film 52 in an area used for creating a pixel section PIX. The common electrode 55 is an electrode for varying an electric field applied to a liquid crystal by changing a voltage applied between the common electrode 55 and the pixel electrode 40. Since the pixel electrode 40 does not exist in the optical sensor section 1, the electric field applied to the liquid crystal may not be controlled. In this case, however, the common electrode 55 plays a role to firmly hold the liquid crystal. Since the common electrode 55 is a transparent electrode layer (TE), the common electrode 55 passes on light arriving at the common electrode 55.

A color-filter substrate 202 is created over the TFT-array substrate 201, sandwiching a liquid-crystal layer 203, an orientation film 56 and a color-filter layer 204 in conjunction with the TFT-array substrate 201. The liquid-crystal layer 203, the orientation film 56 and the color-filter layer 204 are piled up in the bottom-up direction over the TFT-array substrate 201 in the same order as an order in which the liquid-crystal layer 203, the orientation film 56 and the color-filter layer 204 are enumerated in this statement.

As shown in the cross-sectional diagram of FIG. 6, in the color-filter layer 204, a black matrix 21K is created on each boundary between the optical sensor section 1 and the pixel section PIX. A sensor opening SA is created between two black matrixes 21K adjacent to each other. In the pixel section PIX within a range shown in the cross-sectional diagram of FIG. 6, a color filter 21 created in a pixel opening XA is shown. The color filter 21 is one of color filters 21R, 21G and 21B for the red, green and blue colors respectively.

The Structure and Light Receiving Characteristic of the Photodiode PD

Figure 7A:
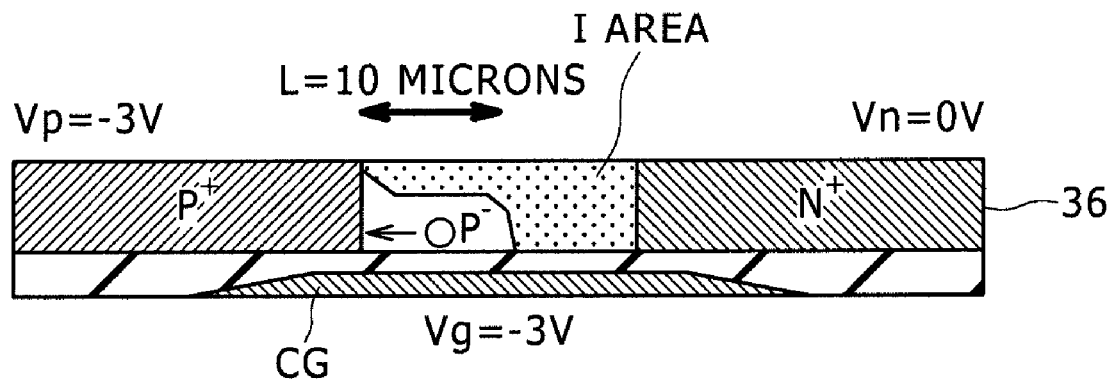
FIG. 7A is a cross-sectional diagram showing a cross section of the photodiode PD having a PIN structure.
Figure 7B:
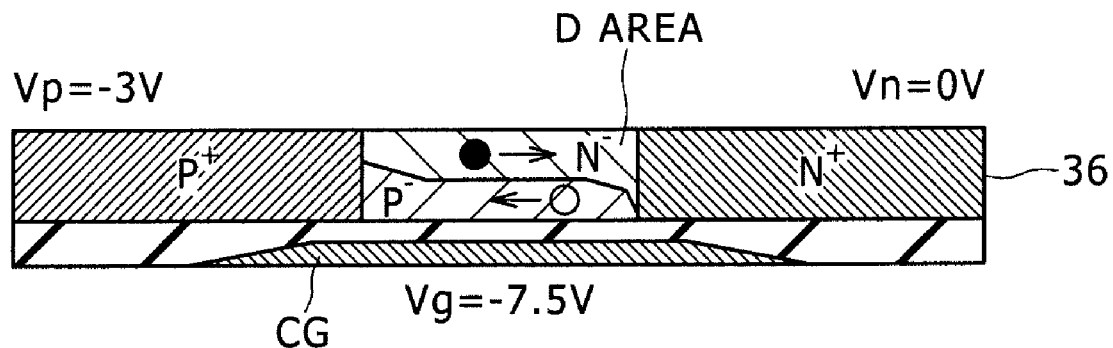
FIG. 7B is a cross-sectional diagram showing a cross section of the photodiode PD having a PDN structure.

FIG. 7 is a plurality of cross-sectional diagrams each showing a cross section of a photodiode PD. To be more specific, FIG. 7A is a cross-sectional diagram showing a cross section of a photodiode PD having the PIN structure whereas FIG. 7B is a cross-sectional diagram showing a cross section of a photodiode PD having the PDN structure.

In the case of the PIN-structured photodiode PD shown in the cross-sectional diagram of FIG. 7A, the area sensitive to received light is an I area having no injected impurities. In the case of the PDN-structured photodiode PD shown in the cross-sectional diagram of FIG. 7B, on the other hand, the area sensitive to received light is a D area having N-type impurities injected thereto at a low concentration. Thus, the D area is an N-area as described earlier.

When a reversed bias is applied to the photodiode PD as shown in either of the cross-sectional diagrams of FIG. 7 for example, a depletion layer is spread in the I or D area. In order to enhance the process of spreading the depletion layer, back gate control is executed. The back gate control is electric-field control executed by making use of a control gate CG. In the case of the PIN-structured photodiode PD shown in the cross-sectional diagram of FIG. 7A, however, at the most, a spread depletion layer of approximately 10 microns from the P+ area is resulted in. In the case of the PDN-structured photodiode PD shown in the cross-sectional diagram of FIG. 7B, however, the depletion layer is spread throughout all but the entire D area. Thus, the photodiode PD having the PDN structure offers a merit of a wide area sensitive to received light as a merit resulting from the depletion layer spread all but throughout the entire D area.

In this embodiment, the photodiode PD can have either the PIN structure or the PDN structure.

The photodiode PD functioning as a position sensor having either one of the PIN and PDN structures described above is sensitive to invisible light or desirably designed to have a peak of sensitivity.

Examples of invisible light are the infrared light and the ultraviolet light. It is to be noted that the CIE (Commission International de l' Eclairage) has determined that wavelengths on the boundary between the ultraviolet light serving as an example of the invisible light and the visible light are in the range 360 nm to 400 nm whereas wavelengths on the boundary between the infrared light also serving as an example of the invisible light and the visible light are in the range 760 nm to 830 nm. From a practical point of view, light having wavelengths equal to or smaller than 350 nm is regarded as ultraviolet light whereas light having wavelengths equal to or greater than 700 nm is regarded as infrared light. In the case of this embodiment, each of any arbitrary wavelength in the range 360 nm to 400 nm and any arbitrary wavelength in the range 760 nm to 830 nm can be used as a wavelength on a boundary between the visible light and invisible light.

If the IR (infrared) light is used as invisible light, it is desirable to create the thin-film semiconductor layer 36 of a photodiode PD having a peak of sensitivity to the IR light from single-crystal silicon or multi-crystal silicon having an energy band gap of 1.1 eV, which is smaller than a typical value of 1.6 eV, as an energy band gap between a valence electron band and a conduction band. The value of 1.6 eV is a typical value of the energy band gap of a light receiving device for receiving visible light. The energy band gap Eg can be found from the following equations:

$$Eg = h \times v \text{ and } v = 1/\lambda.$$

where notation h denotes the Planck constant whereas notation $\lambda$ denotes the wavelength of the light.

On the other hand, the thin-film semiconductor layer 36 may be made of a semiconductor material which has a distribution of energy band gap levels. An example of such a semiconductor material is the amorphous silicon or the single-crystal silicon. In the case of such a thin-film semiconductor layer 36, the light receiving device also has a light receiving power for invisible light such as the infrared light or the ultraviolet light or is also sensitive to the invisible light. That is to say, a photodiode PD made of such a semiconductor material has a light receiving power for invisible light such as the infrared light or the ultraviolet light or is sensitive to the invisible light. Thus, such a photodiode PD can be used as a light receiving device for receiving visible light and invisible light.

As is obvious from the above description, a photodiode PD well usable in the embodiment has a thin-film semiconductor layer 36 made from multi-crystal silicon, crystal silicon, amorphous silicon or fine crystal silicon. In either case, the photodiode PD used in the embodiment is designed by selecting such a semiconductor material that the absorption coefficient for the infrared light is large in comparison with a photodiode PD designed for receiving visible light.

A photodiode PD which has a light receiving power for invisible light such as the infrared light or the ultraviolet light or is also sensitive to the invisible light is prone to deteriorations of the S/N ratio. The deteriorations of the S/N ratio are caused by stray light hitting the photodiode PD after being reflected repeatedly in the liquid-crystal panel 200 without reaching a subject of detection.

In this embodiment, in order to reduce the effect of the stray light, a lens array 60 is provided on the backlight side (that is, the rear-surface side) in the liquid-crystal panel 200 as shown in the cross-sectional diagram of FIG. 6. Each light converging lens 60A of the lens array 60 is placed at a location corresponding to an optical sensor section 1.

Wires and electrodes provided in the liquid-crystal panel 200 may undesirably reflect light. In the cross section shown in the cross-sectional diagram of FIG. 6 for example, wires such as the VDD supply line 31, the VSS supply line 32 and the detection line 35 as well as the control gate CG used as an electrode may undesirably reflect light.

When invisible light hits these wires (except a transparent electrode) or such an electrode and is reflected by the wires or the electrode, not merely does the amount of light reaching a subject of detection decrease, but the amount of stray light returned to a light receiving device before reaching the subject of detection also increases.

In order to solve the problem described above, each light converging lens 60A is designed to have a lens curved surface protruding toward the rear-surface side so that the focal point FP of the light converging lens 60A is positioned inside the liquid-crystal panel 200. It is desirable to have the focal point FP of every light converging lens 60A positioned inside the liquid-crystal panel 200 and determine the shape and position of each light converging lens 60A so that the optical axis of the light converging lens 60A passes through an opening section provided with neither wire nor electrode which are capable of reflecting incident light to result in stray light.

In the top-view diagram of FIG. 4A, every opening section is a section shown by a dashed line. The opening section is a hole providing the largest path for passing on light. When looking at the optical sensor section 1 from a position above the optical sensor section 1, an opening section is a hole provided with no member capable of reflecting light as a hole followed by a largest range capable of passing on light due to nonexistence of a black matrix 21K or another light masking layer. The member capable of reflecting light may be a device, a wire, an electrode or the like.

It is to be noted that, in the top-view diagram of FIG. 4A, the backlight side of a light receiving area (which can be an I or D area) of the three transistors TR, TS and TA is shielded by the electrodes of each of the transistors TR, TS and TA from light. On the other hand, the front-surface side also needs to be shielded from external light. Thus, in the planar pattern of the black matrix 21K shown in the top-view diagram of FIG. 3 for example, a light shielding material or the like actually shields a portion of the sensor opening section SA from external light. Not specially shown in the top-view diagram of FIG. 3, the light shielding material used for making the portion of the sensor opening section SA is the same as the material for making the black matrix 21K. In the case of a photodiode PD, however, it is not necessary to shield the front-surface side from external light. This is because the photodiode PD is hardly sensitive to external light which includes a visible-light component as the main component. For the same reason, the front-surface side of the switching device SW employed in each pixel section PIX is also shielded from external light.

By also considering a light shielding layer shown in none of the figures, an opening section is prescribed in a range inside an optical sensor section for which each of the light shielding layers does not exist in a top view.

It is further desirable to have each light converging lens 60A converge light so that the focal point FP of the converged light beam is positioned on a layer between a layer including wires embedded therein and a layer made of a GM (gate metal). In the typical liquid-crystal panel 200 shown in the cross-sectional diagram of FIG. 6, the layer including wires embedded therein is the second interlayer insulation film 52 whereas the embedded wires are the VDD supply line 31, the VSS supply line 32 and the detection line 35. It is still further desirable to have each light converging lens 60A converge light so that the focal point FP of the converged light beam is positioned on the second interlayer insulation film 52 or even further desirable to have each light converging lens 60A converge light so that the focal point FP of the converged light beam is positioned in a portion included in the second interlayer insulation film 52 as a portion between the bottom and top surfaces of the embedded wires.

By having each light converging lens 60A converge light in this way, the radius of a light beam passing through gaps between wires is reduced so that the light beam is not reflected by the wires. The reduced radius prevents stray light from being generated or reduces the amount of generated stray light.

Operations

Next, typical rough operations carried out by the transmission-type liquid-crystal display apparatus 100 are explained.

Illumination light generated by the backlight 300 provided on the rear-surface side of the liquid-crystal panel 200 is introduced to the inside of the liquid-crystal panel 200 from a lens array 60 and radiated to the external world from the front surface of the liquid-crystal panel 200 by way of the first polarization board 206, the TFT-array substrate 201, the liquid-crystal layer 203, the color-filter layer 204, the color-filter substrate 202 and the second polarization board 207 in the same order as an order in which the first polarization board 206, the TFT-array substrate 201, the liquid-crystal layer 203, the color-filter layer 204, the color-filter substrate 202 and the second polarization board 207 are enumerated in this sentence.

In the course of passing through the liquid-crystal panel 200, the illumination light is subjected to optical polarization and modulation processes carried out to change the polarization plane and optical strength of the light.

To put it in detail, illumination light generated by the backlight 300 provided on the rear-surface side of the liquid-crystal panel 200 enters a lens array 60. As already explained earlier, the lens array 60 includes light converging lenses 60A each created at a location corresponding to a sensor area PA2 in which an optical sensor section 1 is provided. It is desirable to create each light converging lens 60A at a location corresponding to the opening section of the optical sensor section 1.

The light converging lens 60A converges incident light hitting the light converging lens 60A so that the focal point FP of the converged light beam is positioned in the liquid-crystal panel 200. On the other hand, each of lens-array portions other than the light converging lenses 60A is typically a lens member made of parallel planar boards. Thus, light entering each of the lens-array portions other than the light converging lenses 60A is radiated from the lens array 60 without being converged and spread.

Light radiated from the light converging lens 60A efficiently passes through an opening section provided in the optical sensor section 1. Thus, light passing through the optical sensor section 1 is not reflected by surrounding light reflecting members.

In general, a number of devices, a number of wires and a number of connection members which are contact sections for connecting the devices and the wires are created on the TFT-array substrate 201 so that light is reflected to a certain degree by the devices, the devices and the connection members, inevitably causing the light to be attenuated, unless the light is converged in advance by a light converging lens 60A.

For the reason described above, in this embodiment, in order to prevent light from attenuating or prevent the light transmission efficiency from decreasing, the lens array 60 is provided with light converging lenses 60A each created at least a location corresponding to a sensor area PA2 in which an optical sensor section 1 is provided.

As explained above, the light passing through a lens array 60 is radiated to the external world from the front surface of the liquid-crystal panel 200 by way of the first polarization board 206, the TFT-array substrate 201, the liquid-crystal layer 203, the color-filter layer 204, the color-filter substrate 202 and the second polarization board 207 in the same order as an order in which the first polarization board 206, the TFT-array substrate 201, the liquid-crystal layer 203, the color-filter layer 204, the color-filter substrate 202 and the second polarization board 207 are enumerated in this sentence.

In the course of transmission of the light through the liquid-crystal panel 200, when the light is passing through the first polarization board 206, the propagating light is polarized in a first direction. When the light is passing through the liquid-crystal layer 203, due to an anisotropic effect of molecules in the liquid crystal, the polarization direction of the propagating light changes by an angle determined in advance along the layout direction of the liquid-crystal molecules. When the light is passing through the second polarization board 207, the propagating light is polarized in a second direction shifted from the first direction by an angle determined in advance.

A polarization angle of a process of propagation through the liquid-crystal layer 203 in one of the three polarization processes can be changed independently for every pixel section by controlling the intensity of an electric field applied to the liquid-crystal layer 203 in accordance with the electric potential of an input video signal. Thus, each light passing through a pixel section is subjected to a modulation process producing light with brightness which changes in accordance with the electric potential of the input video signal. The light produced by the pixel section is then radiated from the liquid-crystal panel 200, resulting in a displayed image determined in advance by the input video signal.

As explained earlier, the liquid-crystal panel 200 has a available display area PA for displaying an image and, in each of a plurality of pixel areas PA1 in the available display area PA, a plurality of pixel sections are created. In each of a plurality of sensor areas PA2 in the available display area PA, an optical sensor section 1 including a light receiving device is provided so as to implement the function of the so-called touch panel. The light-receiving device is a device for detecting incoming light in order to determine typically the position of a detection subject such as a finger of the user or a stylus pen.

Unlike light passing through a pixel section, light passing through the optical sensor section 1 is radiated from the liquid-crystal panel 200 without being subjected to a modulation process according to an electrical signal.

In the course of an operation carried out to display an image, typically, an application may output a prompting message to request the user to enter a command. In such a case, the user lightly touches the display screen by making use of typically either of a finger and a stylus pen which each serve as a subject of detection.

When the detection subject such as a finger of the user or a stylus pen is coming into contact with the display screen or approaching the display screen, light radiated from the liquid-crystal panel 200 is reflected by the subject of detection and returned to the inside of the liquid-crystal panel 200. The reflected light coming from the subject of detection is refracted and reflected repeatedly by reflective things such as layer boundary surfaces and wires in the liquid-crystal panel 200 so that, in general, the reflected light propagates through the liquid-crystal panel 200 while being spread. Thus, the reflected light arrives at least one of a plurality of optical sensor sections 1, the number of which is determined by the size of the detection subject.

When some of the reflected light arriving at an optical sensor section 1 hits a portion of the photodiode PD biased reversely by a voltage determined in advance, the photodiode PD converts the hitting light into an electrical signal, outputting electric charge corresponding to the signal from typically the anode A. The amount of the electric charge represents received-light data proportional to the amount of the reflected light received by the photodiode PD. The received-light data or the amount of the electric charge is output from the detection line 35 of a read circuit already explained before by referring to the circuit diagram of FIG. 4B as a detected electric potential Vdet or a detected current Idet.

A switch array (SEL.SW.) 14 employed in the liquid-crystal panel 200 as shown in the top-view diagram of FIG. 2 supplies the detected electric potential Vdet or the detected current Idet to the sensor driver 13 which collects the detected electric potential Vdet or the detected current Idet as received-light data. The sensor driver 13 then supplies the received-light data to the position detecting section 402 of the data processing section 400 employed in the transmission-type liquid-crystal display apparatus 100 as shown in the cross-sectional diagram of FIG. 1. In the data processing section 400, the position detecting section 402 or the control section 401 acquires a pair of row and column addresses received from the sensor driver 13 employed in the liquid-crystal panel 200 for every detected electric potential Vdet or every detected current Idet in a real time manner. The control section 401 or the position detecting section 402 stores information on column and row addresses in a memory employed in the data processing section 400 by associating the information on column and row addresses with information represented by the detected electric potential Vdet or the detected current Idet as information on a detection-subject position on the display screen of the liquid-crystal panel 200. The memory itself is not shown in the cross-sectional diagram of FIG. 1.

On the basis of the pieces of information stored in the memory, by overlapping the information on a detection-subject position on the display screen of the liquid-crystal panel 200 over information displayed on the display screen of the liquid-crystal panel 200, the transmission-type liquid-crystal display apparatus 100 is capable of determining that the user has entered a command or entered input information determined in advance. The user enters the command by taking a detection subject such as a finger or a stylus pen into contact with a portion of the information displayed on the display screen of the liquid-crystal panel 200 or moving the subject of detection so as to approach the portion. The user enters the input information by moving a detection subject such as a finger or a stylus pen from a position to another over the information displayed on the display screen of the liquid-crystal panel 200. That is to say, the transmission-type liquid-crystal display apparatus 100 is capable of implementing the same function as that of a configuration, which includes a touch panel added to the liquid-crystal panel 200, by making use of a thin liquid-crystal panel 200 including no added touch panel. Such a thin liquid-crystal panel 200 capable of implementing the same function as that of a configuration including a touch panel added to the liquid-crystal panel 200 is referred to as an in-cell touch panel.

Incidentally, display apparatus according to the embodiment are by no means limited to the display apparatus described so far. That is to say, it is possible to provide a variety of modified versions derived from the embodiment as described as follows.

First Modified Version

Figure 8:
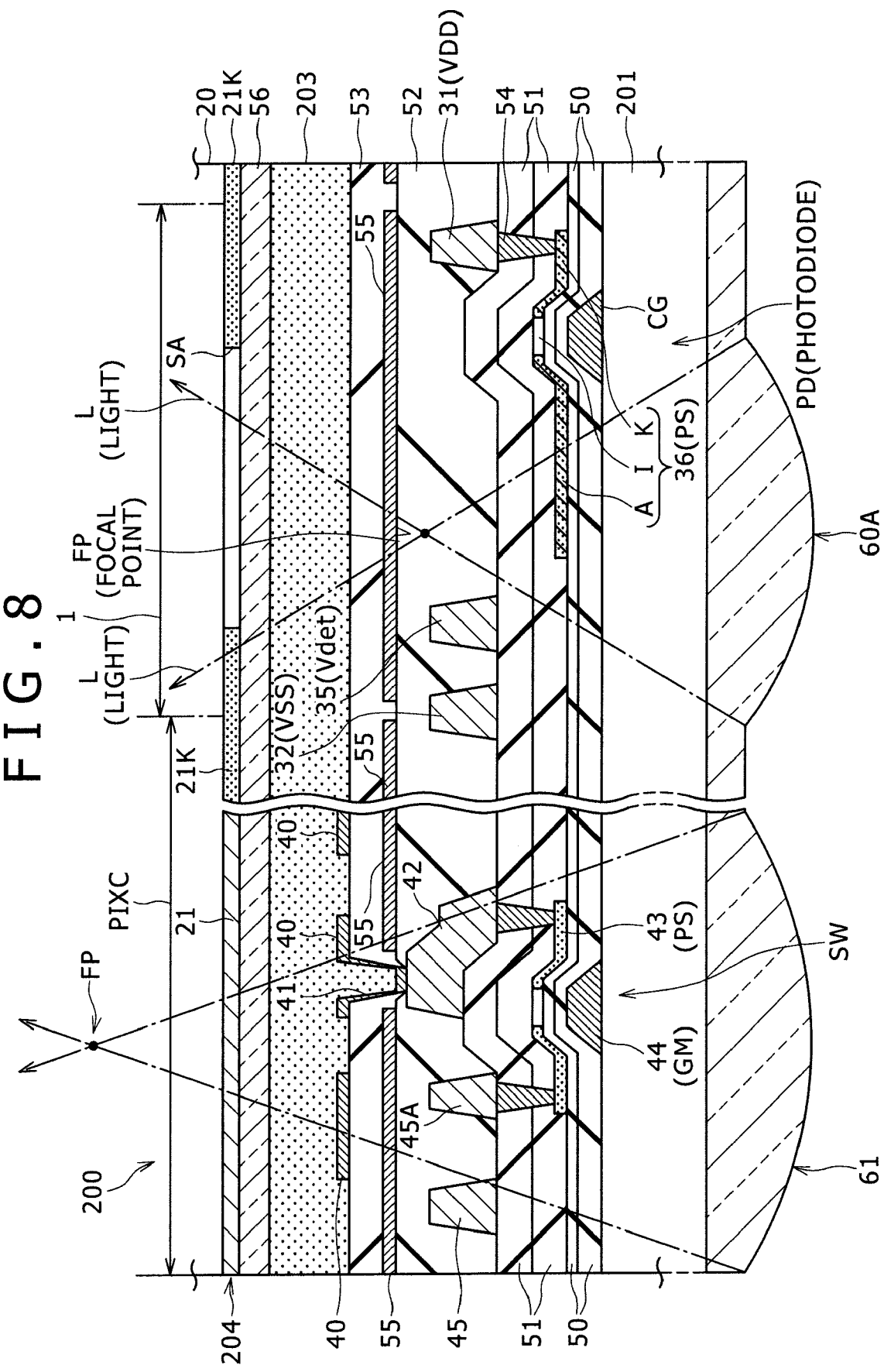
FIG. 8 is a cross-sectional diagram showing a cross section of a first modified version as a cross section which is derived from the cross section shown in the cross-sectional diagram of FIG. 6 as the cross section of the liquid-crystal panel according to the embodiment of the present invention.

FIG. 8 is a cross-sectional diagram showing a cross section of a first modified version as a cross section derived from the cross section shown in the cross-sectional diagram of FIG. 6 as the cross section of the liquid-crystal panel 200 according to the embodiment. The diagrams of FIGS. 2 to 5 and 7 can be applied to the first modified version all but as they are. That is to say, the first modified version is similar to the embodiment except for the lens array 60 employed in the transmission-type liquid-crystal display apparatus 100, which is shown in the cross-sectional diagram of FIG. 1, as described as follows.

In the liquid-crystal panel 200 shown in the cross-sectional diagram of FIG. 8, at a location existing on the rear-surface side as a location corresponding to a pixel section PIX, a light converging lens 61 is newly provided. The focal point FP of each light converging lens 60A provided on a side close to the optical sensor section 1 is located inside the liquid-crystal panel 200. On the other hand, the focal distance FD of the light converging lens 61 is made longer than the focal distance FD of the light converging lens 60A. In the typical cross section shown in the cross-sectional diagram of FIG. 8, the focal point FP of each light converging lens 61 is located outside the liquid-crystal panel 200.

In a pixel section PIX, in order to avoid light having a mixed color, light generated by the backlight 300 of the cross section shown in the cross-sectional diagram of FIG. 1 is radiated as parallel light beam or, even if the radiated light is spread light, the radiated light should not be spread too much in order to avoid a mixed color. It is thus necessary to make the focal distance FD of the light converging lens 61 relatively long.

A light beam radiated from the light converging lens 61 passes through an area used for creating a switching device SW while decreasing the radius of the light beam. At that time, it is desirable to reduce the radius of the light beam to such a degree that the light beam does not hit an aluminum (Al) wire (or a trunk line) such as the signal line 45. Thus, the efficiency of the utilization of the light generated by the backlight 300 can be increased. In this case, however, the light beam is allowed to hit a small-area branch portion 45A of the signal line 45 or the internal wire 42. Since each of the area of the branch portion 45A of the signal line 45 and the area of the internal wire 42 is small, there is all but no effect on the efficiency of the utilization of the light generated by the backlight 300.

As shown in the top-view diagrams of FIGS. 4A and 5, in both the optical sensor section 1 and the pixel section PIX, a wire oriented in the column direction (that is, in the longitudinal direction of the diagrams) exists. As shown in the top-view diagram of FIG. 3, however, a large width in the row direction (that is, in the transversal direction of the diagram) provides a margin for increasing the focal distance FD. It is thus desirable to reduce the width in a direction perpendicular to the wire direction of the optical sensor section 1 to a value smaller than the width of the pixel section PIX. The width in a direction perpendicular to the wire direction of the optical sensor section 1 is the width in the row direction.

In the first modified version, the light converging lenses 61 and the light converging lenses 60A are created in the same lens array 60.

Second Modified Version

The light converging lens 61 of the cross section shown in the cross-sectional diagram of FIG. 8 may be created in a lens array other then the lens array 60 including the light converging lens 60A. The other lens array is not shown in the cross-sectional diagram of FIG. 8.

If it is particularly difficult to create the light converging lenses 61 and the light converging lenses 60A in the same lens array 60, the light converging lens 61 of the cross section shown in the cross-sectional diagram of FIG. 8 may be created in a lens array other then the lens array 60 including the light converging lens 60A.

If two different lens arrays are used, it is possible to change the positions of the light converging lenses 61 and the light converging lenses 60A in the direction of the thickness of the liquid-crystal panel 200. Thus, the second modified version offers a merit of higher freedom to determine the positions of the light converging lenses 61 and the light converging lenses 60A in order to control the positions of the focal points FP in an attempt to increase the efficiency of the light utilization.

Third Modified Version

In addition to the function of the photodiode PD serving as a light receiving device for receiving invisible light, a third modified version is provided with a function for detecting external light including a visible light component as a main component and controlling the intensity of light generated by the backlight 300 in accordance with the result of the detection. The functions of the first and second modified versions can also be implemented in the third modified version. In addition, the diagrams of FIGS. 1 to 7 (or 8) are applicable to the third modified version.

An external-light sensor for detecting the external light cited above is shown in none of the diagrams of FIGS. 1 to 8. However, such an external-light sensor can be provided in each of the available display area PA and the peripheral area CA of the liquid-crystal panel 200 shown in the cross-sectional diagram of FIG. 1. The number of such external-light sensors and the locations of the sensors can be determined arbitrarily.

If the external-light sensors are provided in the available display area PA, the sensors can be laid out to form a matrix in the same way as the photodiodes PD each serving as an optical sensor for detecting invisible light. In this case, each of the external-light sensors is provided at a position separated away from a plurality of optical sensors surrounding the external-light sensor by a uniform distance. For example, the photodiodes PD and the external-light sensors can be provided to form a checkered pattern in a top view of the available display area PA.

The pattern does not have to be a checkered pattern but can be any pattern as long as the external-light sensors are provided at equal intervals. As an alternative, the external-light sensors are laid out at locations determined in advance. The locations determined in advance are locations each close to a corner of the available display area PA and close to least one of the outer sides of the available display area PA. That is to say, there are no limitations on the number of such external-light sensors and the locations of the sensors.

The basic configuration of each external-light sensor can have a top view and an equivalent circuit which are identical with respectively the top view shown in the top-view diagram of FIG. 4A and the equivalent circuit shown in the circuit diagram of FIG. 4B. However, a photodiode used as an external-light sensor is different from the photodiode PD serving as an optical sensor in that the material of the thin-film semiconductor layer and the like are different. For example, it is nice to create the thin-film semiconductor layer of the external-light sensor from the fine-crystal silicon or the amorphous silicon having a widely distributed energy band gaps so that the external-light sensor has a peak of sensitivity to visible light prescribed to have wavelengths in the range 350 nm to 700 nm. To be more specific, it is nice to create the thin-film semiconductor layer of the external-light sensor from silicon having an energy band gap of 1.6 eV.

It is to be noted that, as already explained earlier, the thin-film semiconductor layer of the photodiode PD serving as an optical sensor can be made from the fine-crystal silicon or the amorphous silicon. However, the energy band gap of the silicon used for making the thin-film semiconductor layer of the photodiode PD serving as an optical sensor is different from the energy band gap of the silicon used for making the thin-film semiconductor layer of the photodiode serving as an external-light sensor so that the characteristic of absorption of infrared light for the optical sensor is different from the characteristic of absorption of infrared light for the external-light sensor. However, each of the thin-film semiconductor layer of the external-light sensor and the thin-film semiconductor layer of the optical sensor can be made of a thin-film semiconductor layer material such as either of the poly-silicon and the crystal silicon which each have an energy band gap different from the fine-crystal silicon or the amorphous silicon and a somewhat low sensitivity to a certain degree.

The data processing section 400 employed in the liquid-crystal panel 200 shown in the cross-sectional diagram of FIG. 1 controls the operation, which is carried out by the backlight 300 to generate illumination light, on the basis of received-light data obtained from the external-light sensors. To put it in detail, in the data processing section 400, controlled by the control section 401, the position detecting section 402 detects the amplitude of a signal proportional to the luminance of external light (that is, detects the amount of stored electric charge) on the basis of a voltage value representing a detected electric potential Vdet or a current value representing a detected current Idet. The voltage value representing a detected electric potential Vdet or the current value representing a detected current Idet is the received-light data cited above. Then, on the basis of the result of detecting the amplitude, the control section 401 adjusts the intensity of light generated by the backlight 300 employed in the transmission-type liquid-crystal display apparatus 100.

That is to say, if the received-light data obtained from the external-light sensors indicates that the intensity of the received light is large, the data processing section 400 controls the backlight 300 to generate illumination light having a larger intensity. If the received-light data obtained from the external-light sensors indicates that the intensity of the received light is small, on the other hand, the data processing section 400 controls the backlight 300 to generate illumination light having a smaller intensity.

Generally, in an environment allowing external light such as sunlight in particular to shine the display screen of a display apparatus employing thin-film transistors each used as a pixel switch, the display apparatus inadvertently reduces the contrast because of light reflection by a surface layer of the display panel so that the displayed image may not be well recognized in some cases. Thus, it is necessary to set the luminance of light radiated out by the display panel itself to the environment external to the surface of the display panel at a value at least equal to the luminance of external light reflected by the surface of the display panel. In order to set the luminance of light radiated out by the display panel itself at a big value, the data processing section 400 controls the backlight 300 radiating illumination light from the rear surface of the display panel to generate illumination light having an even larger intensity.

In an environment allowing merely little external light to shine the display screen of such a display apparatus, on the other hand, the display apparatus hardly reduces the contrast because of light reflection by a surface layer of the display panel so that the quality of the displayed image does not deteriorate. Thus, it is nice to set the luminance of light radiated out by the display panel itself to the environment external to the surface of the display panel at a relatively small value. In order to set the luminance of light radiated out by the display panel itself at a small value, the data processing section 400 controls the backlight 300 to generate illumination light having a smaller intensity. In this way, the power consumption of the backlight 300 can be reduced.

The third modified version thus offers a merit that such degradation of the picture quality or such deteriorations of the contrast and reduction of the power consumption can be controlled adaptively to changes in external-light amount.

Figure 9:
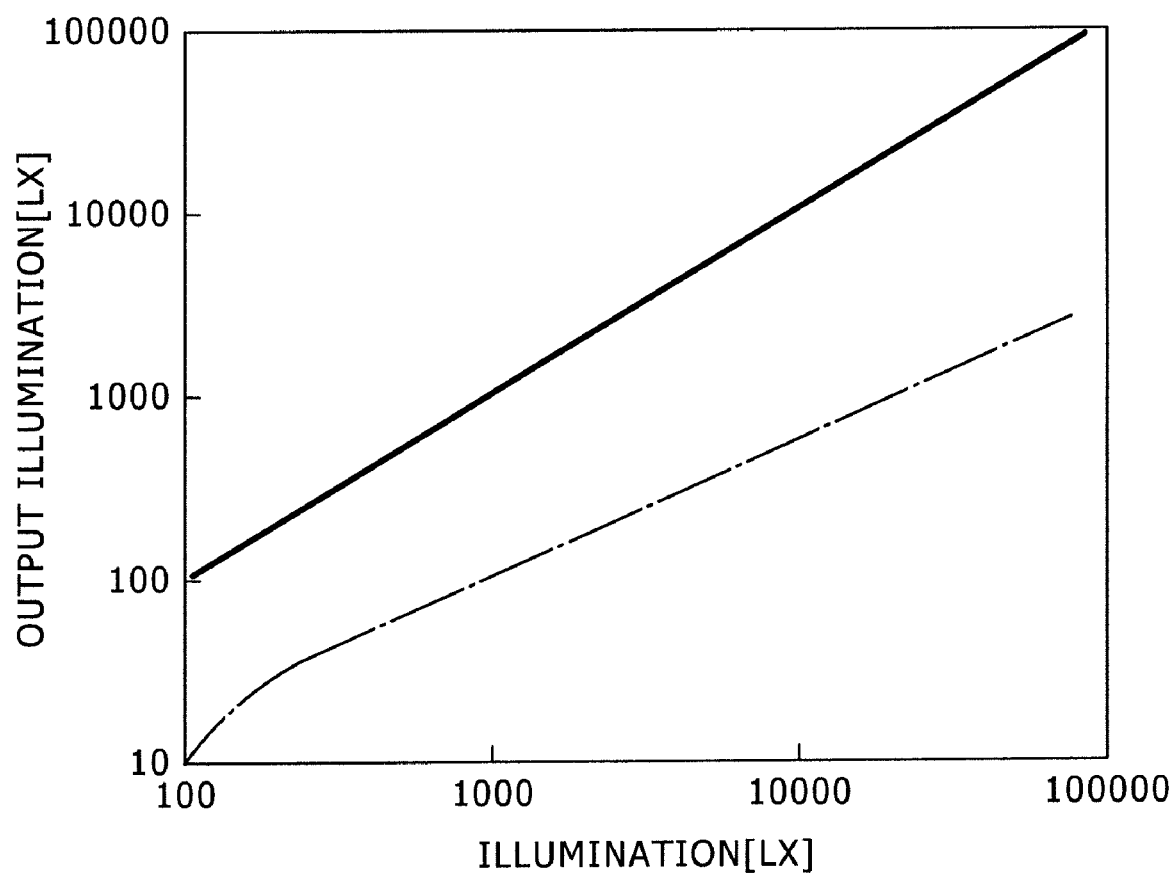
FIG. 9 is a diagram showing relations between changes in external-light luminance and changes in luminance representing received-light data in a third modified version derived from the embodiment of the present invention.

FIG. 9 is a diagram showing relations between changes in external-light luminance and changes in luminance representing received-light data in the third modified version. The horizontal axis in the diagram of FIG. 9 represents the changes in external-light luminance whereas the vertical axis represents the changes in received-light data which is obtained from external-light sensors. Both the changes in external-light luminance and the changes in luminance representing received-light data are expressed in terms of lx units. A solid line in the diagram of FIG. 9 represents a relation between the changes in external-light luminance and the changes in luminance representing received-light data for a case in which the external-light sensors are created in the available display area PA, that is, for a case of applying a layout of external-light sensors in the available display area PA. On the hand, a dashed line in the diagram of FIG. 9 represents a relation between the changes in external-light luminance and the changes in luminance representing received-light data for a case in which the external-light sensors are created in the peripheral area CA, that is, for a case of not applying a layout of external-light sensors in the available display area PA.

Let us assume for example that external light having a luminance of 1,000 lx indicated by the horizontal axis hits the display screen. In this case, as shown in the diagram of FIG. 9, received-light data represented by a luminance of about 100 lx indicated by the vertical line is obtained for the case in which the external-light sensors are created in the peripheral area CA. For the case in which the external-light sensors are created in the available display area PA, on the other hand, received-light data represented by a luminance of about 1,000 lx indicated by the vertical line is obtained. Thus, by creating the external-light sensors in the available display area PA in this way, it is possible to obtain received-light data represented by a luminance about equal to the luminance of the actually received light.

It is therefore obvious from the diagram of FIG. 9 that the layout of received-light sensors in the available display area PA is more desirable than the layout of received-light sensors in the peripheral area CA.

Figure 10A:
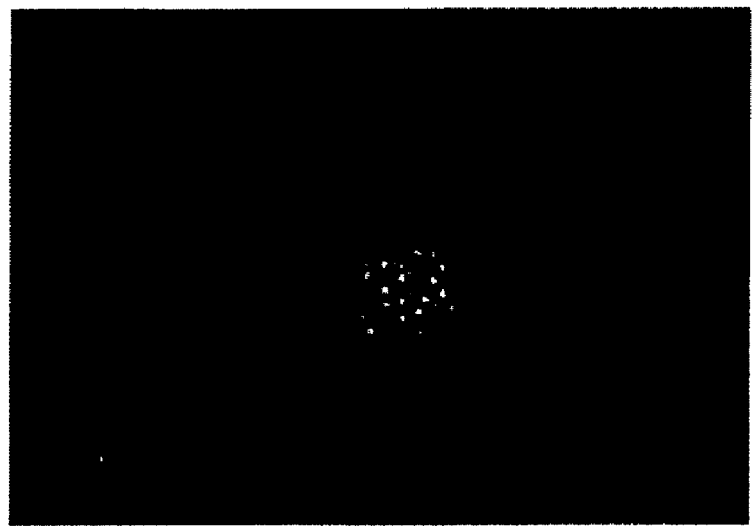
FIG. 10A is a diagram showing the display screen in a configuration not according to the third modified version derived from the embodiment of the present invention.
Figure 10B:
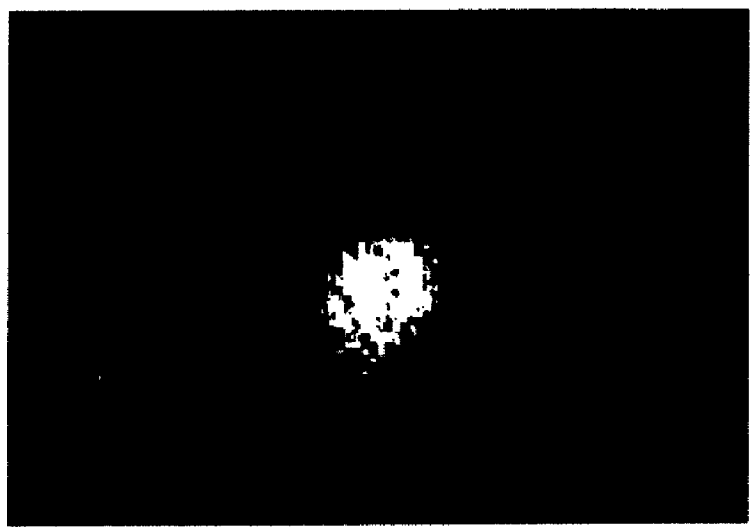
FIG. 10B is a diagram showing the display screen in a configuration according to the third modified version.

FIG. 10 is a plurality of diagrams each showing a display screen. To be more specific, FIG. 10A is a diagram showing the display screen in a configuration not according to the third modified version. On the other hand, FIG. 10B is a diagram showing the display screen in a configuration according to the third modified version.

Each of the diagrams of FIG. 10 shows outputs of a plurality of optical-sensor sections 1 and external-light sensors, which are finely laid out to form a matrix, as white dots each representing a detection case and black dots each representing a no-detection case so as to map the detection and no-detection cases onto respectively white and black dots appearing on the display screen.

It is also obvious from the diagram of FIG. 10 that the layout of received-light sensors in the available display area PA is more desirable than the layout of received-light sensors in the peripheral area CA.

As described above, the third modified version offers a merit that such degradation of the picture quality or such deteriorations of the contrast and reduction of the power consumption can be controlled adaptively to changes in external-light amount. In addition, when the amount of external light coming from the surroundings is small, a more-than-desired large amount of radiated light generated by the backlight 300 is avoided so that generation of stray light from incoming visible light can be prevented or the amount of stray light generated from incoming visible light can be reduced. Thus, the third modified version brings about another merit that it is possible to improve the precision of a process to determine the position of a detection subject for a configuration in which the photodiode PD serving as an optical sensor shown in diagrams including the cross-sectional diagram of FIG. 8 is sensitive to visible light as well as invisible light such as the IR (infrared) light.

Fourth Modified Version

In the cases of the embodiment and the first to third modified versions, the IR (infrared) light is used as main invisible light. However, the invisible light can also be the ultraviolet light.

All TFT structures and a TFD (Thin-Film Diode) structure can each be created as a structure of the top-gate type. The TFT structures are structures including the photodiode PD, the select transistor TS, the amplification transistor TA and the read transistor TR which are included in the read circuit of the equivalent circuit shown in the circuit diagram of FIG. 4B as well as and the switching device SW of a pixel section. On the other hand, the TFD structure is a structure having the control gate CG. In this case, a light shielding layer covers at least the rear-surface sides of a light receiving area (which can be an I or D area) of the TFD and a channel creation area of every TFT in order to prevent light generated directly by the backlight 300 from entering the light receiving area and the channel creation area.

A pixel-unit structure shown in the top-view diagram of FIG. 3 to correspond to the red color filter 21R, the green color filter 21G and the blue color filter 21B as the structure of a pixel unit indicates the colors and layout of the pixels in the pixel unit. In addition, the top-view diagram of FIG. 3 also shows a relation between the position of the sensor opening section SA for the optical sensor section 1 and the position of the pixel unit. However, the structure of a pixel unit and the relation are by no means limited to those shown in the top-view diagram of FIG. 3.

Fifth Modified Version

Each of the embodiment and the first to fourth modified versions is an implementation of not merely a liquid-crystal display apparatus but also a wide range of display apparatus including a display apparatus of a light self generation type and a display apparatus making use of electron movements. The display apparatus of the light self generation type is a display apparatus capable of generating light without making use of a backlight. An example of the display apparatus of the light self generation type is an organic EL (Electro Luminescence) display apparatus. The display apparatus making use of electron movements is a display apparatus applicable to electronic paper.

The display apparatus making use of electron movements is provided with electronic ink between a pixel electrode and a common electrode provided on a transparent substrate facing the pixel electrode. Serving as a substitute for the liquid-crystal layer 203 included in the transmission-type liquid-crystal display apparatus 100 shown in the cross-sectional diagram of FIG. 1, the electronic ink is provided with a plurality of microcapsules having white particles each electrically charged with positive electric charge and black particles each electrically charged with negative electric charge. The microcapsules are suspended in a liquid. The electron movements are movements of particles to the pixel-electrode side and the common-electrode side. Depending on whether an electric field applied between the pixel electrode and the common electrode is a positive or negative electric field, white particles moves to the pixel-electrode side whereas black particles move to the common-electrode side or black particles moves to the pixel-electrode side whereas white particles move to the common-electrode side. When more white particles move to the transparent-substrate side (or the common-pixel side) than black particles do, the pixel looks brighter to the observer of the display screen. By making use of these electron movements, a gradation display determined by input data as a gradation display of the pixel can be implemented. Thus, except for the electron movements utilized in place of the technique of the optical modulation carried out by the liquid-crystal layer 203, the fifth modified version is all but the same as the embodiment described previously.

On the other hand, the organic EL display apparatus does not desire a backlight. Instead, the organic EL display apparatus makes use of the following phenomenon. Organic-material films stacked for every pixel in the display panel are capable of generating light, which has a luminance according to the magnitude of an electric field applied to the organic-material films, by themselves. Thus, it is desirable to create light converging lenses from a lens layer inside a layer. Otherwise, the fifth modified version is all but the same as the embodiment described previously.

In addition, it should be understood by those skilled in the art that a variety of modifications, combinations, sub-combinations and alterations may occur, depending on design requirements and other factors as far as they are within the scope of the appended claims or the equivalents thereof.

Typical Products Employing Display Apparatus

Each of the embodiment and first to fifth modified versions can be applied to a display section employed in a variety of products, which are each typically an electronic instrument, to serve as a section for displaying characters and images.

To put it concretely, each of the embodiment and the first to fifth modified versions can be applied to a display section employed in products including TV receiver sets, personal computers, mobile equipment having an image reproducing function, photographing equipment and vehicle onboard equipment such as a car navigation apparatus. The mobile equipment includes cellular phones, game machines and PDAs whereas the photographing equipment includes still and video cameras.

If infrared light is used as invisible light, a distribution of temperatures of a human body can be detected by the embodiment of the present invention as infrared light. Thus, the embodiment of the present invention can be applied to effective utilization of infrared light in finger vein authentication.

In this case, as a substitute for the liquid-crystal panel 200, a vein authentication panel passing on light generated by a backlight is used as means for carrying out finger vein authentication. To put it concretely, with a finger of a person brought into contact with the surface of the vein authentication panel, infrared light generated by the backlight is radiated to the vein authentication panel to be reflected by the finger and, on the basis of the reflected infrared light, the finger vein authentication is carried out.

In accordance with the embodiment and the first to fifth modified versions, the following merits are reaped.

It is no longer necessary to provide a touch panel on the front-surface side of the display panel to serve as a touch panel adopting an electrostatic-capacitance or resistance method employing a two-layer conductive film or a thin glass board. That is to say, the function of the touch panel is built in the display panel which can be implemented by each of the embodiment and the first to fifth modified versions. Thus, efforts to make the display apparatus compact and, specially, efforts to make the display apparatus thin are successful.

Since received-light data representing a detected position is stored in a memory by being associated with addresses, a plurality of positions separated from each other can be detected at the same time. In addition, it is possible to determine the size of the subject as well as the position of a detection subject.

A process to detect invisible light is a kind of the process to detect light in an attempt to determine the position and size of a detection subject. In the process to detect invisible light, light is converged by making use of light converging lenses in order to increase the efficiency of the utilization of the invisible light. The efficiency of the utilization of invisible light can be interpreted as the intensity of the invisible light reaching a subject of detection. In addition, since generation of stray light from incoming visible light can be prevented or the amount of stray light generated from incoming visible light can be reduced, the S/N ratio in the process to determine the position of a detection subject can be improved and, thus, the position of the detection subject can be detected with a high degree of precision by making use of the display apparatus.

The first modified version is capable of increasing the efficiency of the utilization of visible light. The second modified version offers a merit of higher freedom to determine the positions of the light converging lenses 61 and the light converging lenses 60A in order to control the positions of the focal points FP in an attempt to increase the efficiency of the light utilization. The third modified version is capable of implementing an external-light detection process making use of visible light in a display area of the display apparatus. In particular, a configuration providing external-light sensors in the available display area is capable of measuring luminance on the display screen of the display apparatus with a high degree of precision in comparison with a configuration providing external-light sensors outside the available display area. It is thus possible to improve the precision of an operation to control the intensity of light generated by the backlight.

The display apparatus provided by the embodiment and the modified versions as described above can be applied as a display unit in a variety of aforementioned electronic instruments such as a digital camera, a notebook personal computer, a portable terminal such as a cellular phone and a video camera. That is to say, the display apparatus can be applied in a variety of electronic instruments in all fields to serve as a display unit which is used for displaying a video signal supplied to the electronic instrument or generated in the instrument as an image or a video.

It should be understood by those skilled in the art that various modifications, combinations, sub-combinations and alterations may occur depending on design requirements and other factor in so far as they are within the scope of the appended claims or the equivalents thereof.

What is claimed is:

1. A display apparatus comprising:
a display section;
a light radiating section;
a plurality of light converging lenses; and
a plurality of light receiving devices, wherein
said display section includes
   pixel areas each used for creating a pixel section, and
   sensor areas each used for creating one of said light receiving devices,
said light radiating section outputs light and radiates said output light to said display section from a particular-side surface of said display section,
each of said light converging lenses is created at a location corresponding to one of said sensor areas each located in said display section and converges light generated by said light radiating section on a focal point inside said display section, passing on said converged light to the other-side surface of said display section, and each of said light receiving devices is created in one of said sensor areas to serve as a device for receiving light which arrives at said other-side surface of said display section as light reflected by a subject of detection and further wherein a plurality of said light converging lenses are created to form lens arrays, comprising, a first lens array and a second lens array;

each of said light converging lenses in said second lens array is at a location corresponding to one of said sensor areas to serve as a lens having a focal point in said display section; and each of said light converging lenses in said first lens array is at a location corresponding to one of said sensor areas to serve as a lens having a focal distance longer than the focal distance of each of said light converging lenses created in said second lens array.

2. The display apparatus according to claim 1 wherein each of said sensor areas includes:

any individual one of said light receiving devices;

a read circuit provided for said individual light receiving device;

a plurality of wire layers including a voltage supply line and a signal line which are provided for said individual light receiving device and said read circuit; and an opening section including neither said light receiving devices nor said wire layers; and any individual one of said light converging lenses is created in any specific one of said sensor areas and said light converging lenses are laid out in such a way that the center optical axis of said individual light converging lens passes through said opening section of said specific sensor area.

3. The display apparatus according to claim 1 wherein each of said sensor areas includes:

any individual one of said light receiving devices;

a read circuit provided for said individual light receiving device;

a plurality of wire layers including a voltage supply line and a signal line which are provided for said individual light receiving device and said read circuit; and an opening section including neither said light receiving devices nor said wire layers; and any individual one of said light converging lenses is created in one of said sensor areas and said light converging lenses are laid out in such a way that the focal point of said individual light converging lens coincides with a portion corresponding to said opening section in hierarchical layers including said wire layers embedded.

4. The display apparatus according to claim 1 wherein each of said light receiving devices is an optical sensor which is sensitive to invisible light.

5. The display apparatus according to claim 1 wherein each of said light converging lenses is created at a location associated with only one of said light receiving devices.

6. The display apparatus according to claim 1 wherein a plurality of said light converging lenses are created to form lens arrays; and each of said light converging lenses in each of said lens arrays is created at a location corresponding to one of said sensor areas.

7. The display apparatus according to claim 1 wherein said display apparatus has color filters each capable of passing on light having a color selected from a plurality of colors;

in each of said pixel areas, a plurality of pixel sections are created to serve as pixel sections each dedicated to one of said colors each associated with one of said color filters;

in each of said sensor areas, an optical sensor sensitive to invisible light is created to function as one of said light receiving devices; and on each display line of said display section, one of said sensor areas is created repetitively every few pixel areas so that the ratio of the number of said sensor areas created on said display line to the number of said pixel areas created on the same display line is equal to a fraction determined in advance.

* * * * *